United States Patent
May et al.

(10) Patent No.: US 7,499,875 B1
(45) Date of Patent: Mar. 3, 2009

(54) METHOD AND APPARATUS FOR FACILITATING ONLINE PAYMENT TRANSACTIONS IN A NETWORK-BASED TRANSACTION FACILITY USING MULTIPLE PAYMENT INSTRUMENTS

(75) Inventors: Jason May, San Jose, CA (US); Ian Flint, Mountain View, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 09/577,434

(22) Filed: May 22, 2000

Related U.S. Application Data

(60) Provisional application No. 60/190,420, filed on Mar. 17, 2000.

(51) Int. Cl.
G06Q 40/00 (2006.01)

(52) U.S. Cl. ............... 705/26; 705/37; 705/39; 705/40

(58) Field of Classification Search ............ 705/37, 705/40, 26, 27, 39
See application file for complete search history.

(56) References Cited

U.S. PATENT DOCUMENTS

| | | | |
|---|---|---|---|
| 3,573,747 | A | 4/1971 | Adams et al. |
| 3,581,072 | A | 5/1971 | Nymayer |
| 3,687,256 | A | 8/1972 | Jones |
| 4,106,060 | A | 8/1978 | Chapman, Jr. |
| 4,123,747 | A | 10/1978 | Lancto et al. |
| 4,255,796 | A | 3/1981 | Gabbe et al. |
| 4,317,957 | A | 3/1982 | Sendrow |
| 4,326,098 | A | 4/1982 | Bouricius et al. |
| 4,386,266 | A | 5/1983 | Chesarek |

(Continued)

FOREIGN PATENT DOCUMENTS

CA   2253543   3/1997

(Continued)

OTHER PUBLICATIONS

Joelle Tessler, eBay's Deal with Wells Frago Allows Sellers to Accept Credit, San Jose Mercury News, Mar. 2, 2000.*

(Continued)

*Primary Examiner*—Hani Kazimi
(74) *Attorney, Agent, or Firm*—Schwegman, Lundberg & Woessner, P.A.

(57) ABSTRACT

A method and apparatus for facilitating online payment transactions between participants in a network-based transaction facility are described. In one embodiment, user interface information is communicated to a first participant via a communications network. The user interface information identifies various payment instruments available for processing online payment transactions in the network-based transaction facility. Further, payment option information is received from the first participant via the communications network. The payment option information indicates the willingness of the first participant to accept a payment from a second participant via one or more of the various payment instruments. This payment option information is passed to the second participant via the communications network. Afterwards, personal billing information is accepted from the second participant via the communications network to facilitate an online payment transaction between the first participant and the second participant. The personal billing information concerns a payment instrument selected by the second participant from the payment instruments specified by the first participant.

25 Claims, 20 Drawing Sheets

U.S. PATENT DOCUMENTS

| | | |
|---|---|---|
| 4,412,287 A | 10/1983 | Braddock, III |
| 4,528,643 A | 7/1985 | Freeny, Jr. |
| 4,532,554 A | 7/1985 | Skala |
| 4,645,873 A | 2/1987 | Chomet |
| 4,674,044 A | 6/1987 | Kalmus et al. |
| 4,674,066 A | 6/1987 | Kucera |
| 4,677,552 A | 6/1987 | Sibley, Jr. |
| 4,694,397 A | 9/1987 | Grant |
| 4,713,761 A | 12/1987 | Sharpe et al. |
| 4,727,243 A | 2/1988 | Savar |
| 4,731,842 A | 3/1988 | Smith |
| 4,744,050 A | 5/1988 | Hirosawa et al. |
| 4,755,940 A | 7/1988 | Brachtl et al. |
| 4,759,063 A | 7/1988 | Chaum |
| 4,759,064 A | 7/1988 | Chaum |
| 4,789,928 A | 12/1988 | Fujisaki |
| 4,799,156 A | 1/1989 | Shavit et al. |
| 4,823,264 A | 4/1989 | Deming |
| 4,823,265 A | 4/1989 | Nelson |
| 4,864,516 A | 9/1989 | Gaither et al. |
| 4,903,201 A | 2/1990 | Wagner |
| 4,914,698 A | 4/1990 | Chaum |
| 4,926,480 A | 5/1990 | Chaum |
| 4,932,042 A | 6/1990 | Baral et al. |
| 4,941,170 A | 7/1990 | Herbst |
| 4,947,028 A | 8/1990 | Gorog |
| 4,947,430 A | 8/1990 | Chaum |
| 4,949,256 A | 8/1990 | Humble |
| 4,949,380 A | 8/1990 | Chaum |
| 4,960,981 A | 10/1990 | Benton et al. |
| 4,970,681 A | 11/1990 | Bennett |
| 4,984,178 A | 1/1991 | Hemphill et al. |
| 4,989,238 A | 1/1991 | Iggulden et al. |
| 4,992,940 A | 2/1991 | Dworkin |
| 4,996,711 A | 2/1991 | Chaum |
| 5,025,373 A | 6/1991 | Keyser, Jr. et al. |
| 5,043,891 A | 8/1991 | Goldstein et al. |
| 5,063,507 A | 11/1991 | Lindsey et al. |
| 5,077,665 A | 12/1991 | Silverman et al. |
| 5,077,668 A | 12/1991 | Doi |
| 5,084,819 A | 1/1992 | Dewey et al. |
| 5,093,918 A | 3/1992 | Heyen et al. |
| 5,101,353 A | 3/1992 | Lupien et al. |
| 5,115,326 A | 5/1992 | Burgess et al. |
| 5,122,950 A | 6/1992 | Benton et al. |
| 5,136,501 A | 8/1992 | Silverman et al. |
| 5,146,488 A | 9/1992 | Okada et al. |
| 5,168,446 A | 12/1992 | Wiseman |
| 5,181,238 A | 1/1993 | Medamana et al. |
| 5,193,110 A | 3/1993 | Jones et al. |
| 5,204,961 A | 4/1993 | Barlow |
| 5,205,200 A | 4/1993 | Wright |
| 5,220,501 A | 6/1993 | Lawlor et al. |
| 5,222,018 A | 6/1993 | Sharpe et al. |
| 5,222,234 A | 6/1993 | Wang et al. |
| 5,223,699 A | 6/1993 | Flynn et al. |
| 5,227,778 A | 7/1993 | Vacon et al. |
| 5,227,893 A | 7/1993 | Ett |
| 5,230,048 A | 7/1993 | Moy |
| 5,233,655 A | 8/1993 | Shapiro |
| 5,241,466 A | 8/1993 | Perry et al. |
| 5,243,515 A | 9/1993 | Lee |
| 5,247,591 A | 9/1993 | Baran |
| 5,255,305 A | 10/1993 | Sattar |
| 5,258,908 A | 11/1993 | Hartheimer et al. |
| 5,263,167 A | 11/1993 | Conner, Jr. et al. |
| 5,265,033 A | 11/1993 | Vajk et al. |
| 5,276,628 A | 1/1994 | Schneiderhan |
| 5,280,305 A | 1/1994 | Monroe |
| 5,280,422 A | 1/1994 | Moe et al. |
| 5,283,731 A | 2/1994 | Lalonde et al. |
| 5,283,829 A | 2/1994 | Anderson |
| 5,285,383 A | 2/1994 | Lindsey et al. |
| 5,291,554 A | 3/1994 | Morales |
| 5,295,068 A | 3/1994 | Nishino et al. |
| 5,295,181 A | 3/1994 | Kuo |
| 5,296,848 A | 3/1994 | Witheridge et al. |
| 5,297,027 A | 3/1994 | Morimoto et al. |
| 5,297,031 A | 3/1994 | Gutterman et al. |
| 5,297,032 A | 3/1994 | Trojan et al. |
| 5,299,123 A | 3/1994 | Wang et al. |
| 5,299,255 A | 3/1994 | Iwaki et al. |
| 5,303,303 A | 4/1994 | White |
| 5,303,361 A | 4/1994 | Colwell et al. |
| 5,305,200 A | 4/1994 | Hartheimer et al. |
| 5,311,438 A | 5/1994 | Sellers et al. |
| 5,319,710 A | 6/1994 | Atalla et al. |
| 5,325,297 A | 6/1994 | Bird et al. |
| 5,329,589 A | 7/1994 | Fraser et al. |
| 5,335,170 A | 8/1994 | Petteruti et al. |
| 5,336,870 A | 8/1994 | Hughes et al. |
| 5,339,156 A | 8/1994 | Ishii |
| 5,345,091 A | 9/1994 | Craig |
| 5,354,069 A | 10/1994 | Guttman et al. |
| 5,375,055 A | 12/1994 | Togher et al. |
| 5,383,113 A | 1/1995 | Kight et al. |
| 5,384,703 A | 1/1995 | Withgott et al. |
| 5,394,324 A | 2/1995 | Clearwater |
| 5,402,336 A | 3/1995 | Spiegelhoff et al. |
| 5,414,773 A | 5/1995 | Handelman |
| 5,418,951 A | 5/1995 | Damashek |
| 5,420,926 A | 5/1995 | Low et al. |
| 5,424,938 A | 6/1995 | Wagner et al. |
| 5,424,944 A | 6/1995 | Kelly |
| 5,426,281 A | 6/1995 | Abecassis |
| 5,426,594 A | 6/1995 | Wright et al. |
| 5,428,606 A | 6/1995 | Mosowitz |
| 5,432,841 A | 7/1995 | Rimer |
| 5,436,961 A | 7/1995 | Kobayashi |
| 5,446,759 A | 8/1995 | Campana, Jr. |
| 5,450,425 A | 9/1995 | Gunn et al. |
| 5,453,926 A | 9/1995 | Stroschin et al. |
| 5,457,797 A | 10/1995 | Butterworth et al. |
| 5,465,206 A | 11/1995 | Hilt et al. |
| 5,467,390 A | 11/1995 | Brankley et al. |
| 5,475,740 A | 12/1995 | Biggs, Jr. et al. |
| 5,485,510 A | 1/1996 | Colbert |
| 5,493,692 A | 2/1996 | Theimer et al. |
| 5,508,817 A | 4/1996 | Kunigami |
| 5,521,815 A | 5/1996 | Rose, Jr. |
| 5,526,479 A | 6/1996 | Barstow et al. |
| 5,530,739 A | 6/1996 | Okado et al. |
| 5,537,586 A | 7/1996 | Amram et al. |
| 5,553,145 A | 9/1996 | Micali |
| 5,557,518 A | 9/1996 | Rosen |
| 5,557,728 A | 9/1996 | Garrett et al. |
| 5,559,721 A | 9/1996 | Ishii |
| 5,590,197 A | 12/1996 | Chen et al. |
| 5,592,375 A | 1/1997 | Salmon et al. |
| 5,598,557 A | 1/1997 | Doner et al. |
| 5,637,423 A | 6/1997 | Ovshinsky et al. |
| 5,640,569 A | 6/1997 | Miller et al. |
| 5,649,186 A | 7/1997 | Ferguson |
| 5,650,761 A | 7/1997 | Gomm et al. |
| 5,657,389 A | 8/1997 | Houvener |
| 5,664,111 A | 9/1997 | Nahan et al. |
| 5,664,115 A | 9/1997 | Fraser |
| 5,671,280 A | 9/1997 | Rosen |
| 5,675,784 A | 10/1997 | Maxwell et al. |
| 5,677,955 A | 10/1997 | Doggett et al. |
| 5,684,965 A | 11/1997 | Pickering |
| 5,689,652 A | 11/1997 | Lupien et al. |
| 5,694,546 A | 12/1997 | Reisman |
| 5,696,906 A | 12/1997 | Peters et al. |

| | | | |
|---|---|---|---|
| 5,699,528 A | 12/1997 | Hogan | |
| 5,706,457 A | 1/1998 | Dwyer et al. | |
| 5,708,780 A | 1/1998 | Levergood et al. | |
| 5,710,889 A | 1/1998 | Clark et al. | |
| 5,715,314 A | 2/1998 | Payne et al. | |
| 5,715,399 A | 2/1998 | Bezos | |
| 5,715,402 A | 2/1998 | Popolo | |
| 5,717,989 A | 2/1998 | Tozzoli et al. | |
| 5,724,424 A | 3/1998 | Gifford | |
| 5,727,165 A | 3/1998 | Ordish et al. | |
| 5,732,400 A * | 3/1998 | Mandler et al. | 705/26 |
| 5,742,845 A | 4/1998 | Wagner | |
| 5,757,917 A | 5/1998 | Rose et al. | |
| 5,761,648 A | 6/1998 | Golden et al. | |
| 5,771,291 A | 6/1998 | Newton et al. | |
| 5,771,380 A | 6/1998 | Tanaka et al. | |
| 5,774,870 A | 6/1998 | Storey | |
| 5,778,178 A | 7/1998 | Arunachalum | |
| 5,790,677 A | 8/1998 | Fox et al. | |
| 5,790,790 A | 8/1998 | Smith et al. | |
| 5,794,207 A | 8/1998 | Walker et al. | |
| 5,794,219 A | 8/1998 | Brown | |
| 5,794,221 A * | 8/1998 | Egendorf | 705/40 |
| 5,799,285 A | 8/1998 | Klingman | |
| 5,803,500 A | 9/1998 | Mossberg | |
| 5,818,914 A | 10/1998 | Fujisaki | |
| 5,822,737 A | 10/1998 | Ogram | |
| 5,826,241 A | 10/1998 | Stein et al. | |
| 5,835,896 A | 11/1998 | Fisher et al. | |
| 5,845,265 A | 12/1998 | Woolston | |
| 5,845,266 A | 12/1998 | Lupien et al. | |
| 5,850,442 A | 12/1998 | Muftic | |
| 5,872,848 A | 2/1999 | Romney et al. | |
| 5,873,069 A | 2/1999 | Reuhl et al. | |
| 5,873,072 A | 2/1999 | Kight et al. | |
| 5,884,056 A | 3/1999 | Steele | |
| 5,884,277 A | 3/1999 | Khosla | |
| 5,890,138 A | 3/1999 | Godin et al. | |
| 5,905,974 A | 5/1999 | Fraser et al. | |
| 5,905,975 A | 5/1999 | Ausubel | |
| 5,913,040 A | 6/1999 | Rakavy et al. | |
| 5,920,847 A | 7/1999 | Kolling et al. | |
| 5,922,074 A | 7/1999 | Richard et al. | |
| 5,926,794 A | 7/1999 | Fethe | |
| 5,948,061 A | 9/1999 | Merriman et al. | |
| 5,963,917 A | 10/1999 | Ogram | |
| 5,978,780 A * | 11/1999 | Watson | 705/40 |
| 5,983,196 A | 11/1999 | Wendkos | |
| 5,987,500 A | 11/1999 | Arunachalam | |
| 5,991,739 A | 11/1999 | Cupps et al. | |
| 6,009,412 A | 12/1999 | Storey | |
| 6,014,634 A | 1/2000 | Scroggie et al. | |
| 6,016,484 A * | 1/2000 | Williams et al. | 705/39 |
| 6,029,150 A | 2/2000 | Kravitz | |
| 6,032,133 A | 2/2000 | Hilt et al. | |
| 6,035,288 A | 3/2000 | Solomon | |
| 6,035,402 A | 3/2000 | Vaeth et al. | |
| 6,044,363 A | 3/2000 | Mori et al. | |
| 6,047,264 A | 4/2000 | Fisher et al. | |
| 6,049,785 A * | 4/2000 | Gifford | 705/39 |
| 6,052,670 A | 4/2000 | Johnson | |
| 6,055,518 A | 4/2000 | Franklin et al. | |
| 6,058,417 A | 5/2000 | Hess et al. | |
| 6,061,448 A | 5/2000 | Smith et al. | |
| 6,073,117 A | 6/2000 | Oyanagi et al. | |
| 6,085,176 A | 7/2000 | Woolston | |
| 6,104,815 A | 8/2000 | Alcorn et al. | |
| 6,119,137 A | 9/2000 | Smith et al. | |
| 6,178,408 B1 | 1/2001 | Copple et al. | |
| 6,192,407 B1 | 2/2001 | Smith et al. | |
| 6,202,051 B1 | 3/2001 | Woolston | |
| 6,212,556 B1 | 4/2001 | Arunachalam | |
| 6,216,115 B1 | 4/2001 | Barrameda et al. | |
| 6,234,525 B1 * | 5/2001 | Schroder et al. | 280/748 |
| 6,243,691 B1 | 6/2001 | Fisher et al. | |
| 6,246,996 B1 | 6/2001 | Stein et al. | |
| 6,266,651 B1 | 7/2001 | Woolston | |
| 6,292,796 B1 | 9/2001 | Drucker et al. | |
| 6,301,609 B1 | 10/2001 | Aravamudan et al. | |
| 6,324,525 B1 * | 11/2001 | Kramer et al. | 705/40 |
| 6,415,318 B1 | 7/2002 | Aggarwal et al. | |
| 6,466,917 B1 * | 10/2002 | Goyal et al. | 705/18 |
| 6,529,885 B1 | 3/2003 | Johnson | |
| 6,839,690 B1 | 1/2005 | Foth et al. | |
| 7,194,437 B1 | 3/2007 | Britto et al. | |
| 7,249,055 B1 | 7/2007 | Elder | |
| 2002/0034281 A1 | 3/2002 | Isaacs et al. | |
| 2002/0078152 A1 * | 6/2002 | Boone | 709/204 |
| 2002/0087461 A1 | 7/2002 | Ganesan et al. | |
| 2003/0033248 A1 * | 2/2003 | Shimada | 705/40 |
| 2003/0037112 A1 | 2/2003 | Fitzpatrick et al. | |
| 2003/0046273 A1 | 3/2003 | Deshpande | |
| 2004/0064405 A1 | 4/2004 | Weichert et al. | |
| 2006/0116957 A1 | 6/2006 | May et al. | |
| 2007/0073618 A1 | 3/2007 | Yu et al. | |

FOREIGN PATENT DOCUMENTS

| | | |
|---|---|---|
| EP | 1257964 | 11/2002 |
| JP | 10320646 A | 4/1998 |
| WO | WO 92/15174 | 2/1992 |
| WO | WO-9409439 | 4/1994 |
| WO | WO 96/34356 | 4/1996 |
| WO | WO 97/37315 | 3/1997 |
| WO | WO 99/63461 A1 | 12/1999 |
| WO | WO-0129750 | 4/2001 |
| WO | WO-0152510 | 7/2001 |
| WO | PCT/US01/12398 | 8/2001 |
| WO | WO 01/65338 A2 * | 9/2001 |
| WO | WO-0169406 | 9/2001 |
| WO | WO-0171992 | 9/2001 |
| WO | WO-2007041103 A2 | 4/2007 |
| WO | WO-2007041103 A3 | 4/2007 |

OTHER PUBLICATIONS eBay Announces Agreement to Acquire Payment Enabler, May 18, 1999, PR Newswire p. 3099.*

Excite@Home and Billpoint Make Online Buying and Selling Easy in Excite Classifieds and Auctions, Jun. 30, 1999, Business Wire.*

Roget's International Thesauras, Fifth Edition, 1992, section 731.4 definition of treansaction.*

Merriam Webster's Collegiate dictionary, 10th Ed., 1998, p. 1252, definition of transaction.*

Kaiser, L F and Kaiser M, The Official eBay Guide to Buying, Selling and collecting Just About Anything, Simon and Schuster 1999 pp. 31-35, 108-109 and 133.*

Four pages of aBay feedback infromation dates 1999.*

Billpoint Index page dated Jan. 25, 1999.* eBay Billpoint team "Billpoint, The Ebay Payment Service, Begins Launch Today," [6 paragraphs] *Billpoint News and Announcements* [Online] Available: http://www.billpoint.com/about_bp/bplaunch.html. Accessed Sep. 1, 2000.

eBay Billpoint team (Mar. 1, 2000) "eBay and Wells Fargo Join Forces to Create the Standard for Person-to-Person Payment on the Internet," [10 paragraphs] *Billpoint News and Announcements* [Online] Available: http://www.billpoint.com/about_bp/news-wells.html. Accessed Sep. 1, 2000.

eBay Billpoint team (Jun. 6, 2000) "eBay and Wells Fargo Launch Electronic Check as Alternative to Credit Card and Traditional Checks," [8 paragraphs] *Billpoint News and Announcements* [Online] Available: http://www.billpoint.com/about_bp/news-echeck.html. Accessed Sep. 1, 2000.

eBay Billpoint team (Mar. 29, 2000) "eBay and Visa Announce Person-to-Person Payment Partnership," [8 paragraphs] *Billpoint News and Announcements* [Online] Available: http://www.bilpoint.com/about_bp/news-visa.html. Accessed Sep. 1, 2000.

eBay Billpoint team "New! Instant Purchase From Billpoint," [5 paragraphs] *Billpoint News and Announcements* [Online] Available: http://www.billpoint.com/about_bp/news-ip.html. Accessed Sep. 1, 2000.

Clark, Don, the Wall Street Journal, pB7 (W) pB9 (E) col. 1, Nov. 9, 1994, "Microsoft, Visa to ointly develop PC electronic-shopping software", abstract only.

Day, Jacqueline, Bank Systems & Technology, v32 n1, Jan. 6, 1995, "Industry Players in hot pursuit of secure Internet transaction mode".

Gaffin, Adan, Network World, v11 n50 p. 1, Dec. 12, 1994, "Avrsion therapy: Banks overcoming fear of the 'net."

Lee Goldberg; Electronic Design, Prototype e-mail system includes multimedia, intelligent retrieval; Apr. 4, 1994; pp. 9-10.

Hane; Paula, J., Information Today, NewsEdge Forges Alliances with Content; Oct. 1, 1998; pp. 12-14. Business Wire, Inc.; Individual Selected for Electronic News Delivery to AT&T Global Sales Team; Sep. 9, 1997; pp. 16-17.

Information Today, v12 n3 p. 43, Mar. 1995, "The Check is in the e-mail."

Knowles, Anne, PC Week, Mar. 20, 1995, v12 n11 p. I(2), "Improved Internet security enabling on-line commerce."

Krol, Ed, "The Whole Internet User's Guide & Catalog," 1994, pp. 101-148.

Lang, Curtis, Advertising Age, Dec. 19, 1994, "Cashing in: The rush is on to buy and sell on the Internet", pp. 11-12.

LAN Magazine, Notes Users Get Custom CIS, Mar. 1994, p. 18.

Meyerowitz; robin, MacWeek; Foresight set to introduce FastPace Instant Contact; Jul. 25, 1994; pp. 2-3.

Nash; Jim, Computerworld, Beyond Mail software steps Beyond competition; Aug. 19, 1991; pp. 7-8.

Quint; Barbara, Searcher, Newspapers reborn in electronic information age; Jun. 1993; pp. 21-24.

Rizzo; John, MacUser; And E-mail for all; E-mail software and gateway software packages of creating a cross-platform E-mail system; Jul., 1994; pp. 4-6.

Scheier; Robert, L., PC Week, PDAs spell sea change for the PC Industry; Nov. 16, 1992; pp. 15-18.

Searcher; The "consumer-ization" of Business data; Mar., 1995; pp. 61-63.

Smith; Tom, Network World, Faxing lets daily papers provide up-to-the-minute 'zoned ' news; Feb. 26, 1990; pp. 44-45.

Ira Teinowitz; Advertising Age, Just the fax, ma'am latest newspaper refrain; Apr. 26, 1993; pp. 25-27.

Thomas, Brian, "Internet for Scientists & Engineers" 1995, pp. 57-70.

Malone, TW; Yates, J; et al., "Electmic Markets and Electronic Hierarchies", *Communications—of the ACM*, Jun. 1987, pp. 484-497, vol. 30, No. 6, USA.

Warbelow, A; Kokuryo, J, "Aucnet: TV Auction Network System". *Harvard Business School Case/Study*, Jul. 1989, pp. 1-15, HBVR# 9-190-001, USA.

"Personal Optimized Decision/Transaction Program", *IBM Technocal Disclosure Bulletin*, Jan. 1995, pp. 83-84, vol. 38, No. 1, USA.

NEO, BS, "The implementation of an electronic market for pig trading in Singapore", *Journal of Strategic Information Systems*, Dec. 1992, pp. 278-288, vol. 1, No. 5.

Rockoff, TE; Groves, M., "Design of an Internet-based system for remote Dutch auctions", *Internet Research—Electronic Networking Applications and Policy*, Jan. 1, 1995, vol. 5, No. 4, pp. 10-16.

Massimb, MN; Phelps, BD, "Electronic Trading, Market Structure and Liquifity", *Financial Analysts Journal*, Jan.-Feb. 1994, vol. 50, No. 1, pp. 39-50, Charlottesville, Virginia.

Post, DL; Coppinger, SS, et al., "Application of Auctions as a Pricing Mechinism for the Interchange of Electric Power", *IEEE Transactions on Power Systems*, Aug. 1995, pp. 1580-1584, vol. 10, No. 3.

Hess, CM; Kemerer, CF., "Computerized Loan Organization System: An Industry Case Study of the Electronic Markets Hypothesis", *MIS Quarterly*, Sep. 1994, vol. 18, No. 3, pp. 251-274.

Reck, Martin, "Formally Specifying and Automated Trade Execution System", *Journal of Systems and Software*, 1993, pp. 245-252, vol. 21, Elsevier Science Publishing Co., Inc. New York, Ny.

"Anonymous Delivery of Goods in Electronic Commerce", *IBM Technocal Disclosure Bulletin*, Mar. 1996, pp. 363-366, vol. 39, No. 3.

Lee, G., "Electronic Brokerage and Electronic Auction: The Impact of IT on Market Structures", *Proceedings of the 29th HICSS*, 1996, pp. 397-406, vol. IV.

Clemins, E; Weber, B., "Evaluating the Prospects for Alternative Electronic Securities Markets", *International Conference on Information Systems*, 1991, pp. 53-61, vol. 12.

Mardesich, J., "Onsale Takes Auction gavel electronic", *Computer Reseller News*, Jul. 8, 1996, p. 2 continued on p. 32, Mountain View, California.

"Onsale joins fray as online shopping picks up speed: Internet Booms", *Computer Reseller News*, Jun. 5, 1995, p. 73, CMP Publications, Inc., USA.

Siegmann, Ken, "Nowhere to go but up", *PC Week*, Oct. 23, 1995, p. 1-3, vol. 12, No. 42, Ziff-Davis Publishing Company.

"Onsale: Onsale Brings Thrill of Auctions and Bargain Hunting Online; Unique Internet retail service debuts with week-long charity auction for the Computer Museum in Boston", May 24, 1995, pp. 3.

Schmid, BF., "The Development of Electronic Commerce", *Newsletter of the Competence Centre Electmic Markets*, Oct. 1993, No. 9/10.

Tjostheim, I; Eide, J., "A case study of an on-line auction for the World Wide Web",*Norwegian Computing Center*, No Date Given, pp. 1-10.

Graham, I., "The Emergence of Linked Fish Markets in Europe", *Focus Theme*, No Date Given, pp. 1-4.

Reck, Martin., "Trading-Process Characteristics of Electronic Auctions", *Focus Theme*, No Date Given, pp. 1-7.

Van Heck, E; Ribbers, PM., "Experiences with Electronic Auctions in the Dutch Flower Industry", *Focus Theme*, No Date Given, pp. 1-6.

Lee, HG., "Aucnet: Electronic Intermediary for Used-car Transactions", *Focus Theme*, No Date Given, pp. 1-5.

Klein, S., "Introduction to Electronic Auctions", *Focus Theme*, No Date Given, pp. 1-4.

Turban, E., "Auctions and Bidding on the Internet an Assessment", *Focus Theme*, No Date Given, pp. 1-5.

Zwass, Vladimir., "Electronic Commerce: Structures and Issues", *International Journal of Electmic Commerce*, Fall 1996, pp. 3-23, vol. 1, No. 1.

Business Editors, "Mediappraise: Mediappraise Receives National Award for Web-Based Technology That Enables Companies to Solve Thorny HR Problems," Dec. 14, 1998, 2 pgs., www.businesswire.com.

Business Editors/Computer Writers, "Onsale: Onsale Brings Thrill of Auctions and Bargain Hunting Online; Unique Internet Retail Service Debuts With Week-Long Charity Auction For The Computer Museum in Boston," May 24, 1995, 3 pgs., http://www.dialogweb.com/cgi/dwclient?dwcommand=DWEBPRINT%20810-489267.

Meade, J., "Visual 360: A Performance Appraisal System That's 'Fun' (Evaluation)," HRMagazine, 44, 7, 2 pgs., Jul. 1999, Society for Human Resource Management.

Preist, C., et al., "Adaptive Agents in a Persistent Shout Double Auction," Proceedings, 1 International Conf. on Information and Computation Economies, Oct. 25-28, 1998, pp. 11-18; Charleston, N.C.

Resnick, P., et al., "Reputation Systems," Dec. 2000, Assoc. for Computing Machinery, Communications of the ACM, vol. 43, n. 12, 4 pgs.

"First Virtual (TM) Internet Payment System", http://gii1.gii.com/nicampgn/3ale.htm; XP002128491,(Oct. 15, 1994).

"Globe ID, The Globe ID Payment System", (Spring, 1994).

"Information on Altavista.com", http://web.archive.org/web/*/http://www.altavista.com, 9 pages.

"Information on HomeGain.Com", http://web.archive.org/web/*/http://www.homegain.com, 50 pages, 31 pages.

"NetCheque", http://www.netcheque.com/, (1995), 1-2.

"Visa & Carnegie Mellon plan online payment scheme", *Newsbytes News Network*, (Feb. 15, 1995), 1 pages.

"Workforce Management", *Special Reports*—http://www.connectweb.co.uk/specialreports/workforce/product/1.shtml, (2003), 1-4.

Alban, Oscar, "Your competition is only a click away! Ensuring the quality of your multimedia contact center", *Call Center CRM Solutions*, 18(10), (Apr. 2000),42,44,46+.

Bounds, Wendy , "Carnegie Mellon, Visa plan to offer payment system for data from internet", *Wall Street Journal*, (Feb. 15, 1995),p. B6, WpB6, col. 4.

Brain, Marshall, "How Internet Cookies Work", http://howstuffworks.com/cookie.htm/printable, (2002), 1-7.

Chiem, Phat X., "Live help is on the way: Firms look to text, voice to build customer relationships online", *B to B, The Magazine for Marketing Strategies*, (Dec. 4, 2000), 1-2.

Gollobin, Kelly, "Speaking of Customer Service", *Computer Reseller News*, (Mar. 31, 2000), 73.

Knudsen, Jonathan, "Plugging in Applets", http://www.webreview.com/1999/04_16/developers/04_16_99_1.shtml, (Apr. 16, 1999),6 pages.

Medvinsky, G., et al., "Electronic Currency for the Internet", *EM—Electronic Markets*, No. 9-10, (Oct., 1993),23-24.

Neuman, B C., et al., "Proxy-based Authorization and Accounting for Distributed Systems", *Proceedings of the 13th International Conf. on Distributed Computing Systems*, (May 1993),283-291.

Sirbu, Marvin A., "Internet Billing Service Design and Prototype Implementation", *IMA Intellectual Propert Project Proceedings*, 1(1), http://www.cni.org/docs/ima.lp-workshop/Sirbu.html,(1994), 1-19.

Sirbu, Marvin, et al., "Netbill: An Internet Commerce System Optimized for Network-Delivered Services", *IEEE Personal Communications, 2*, (Aug. 1995),34-39.

Tyson, Jeff, "How Instant Messaging Works", http://www.howstuffworks.com/instant-messaging.htm/printable, (2002), 1-7.

"U.S. Appl. No. 10/461,604, Preliminary Amendment filed Jun. 19, 2003", 38 pgs.

"U.S. Appl. No. 10/461,604, Preliminary Amendment filed Aug. 8, 2003", 98 pgs.

"U.S. Appl. No. 11/238,359 Non-Final Office Action mailed Feb. 28, 2008", Oarn, 9 pgs.

"eBay Launches the Most Comprehensive trust and safety upgrades to the World's largest person to person Trading site.", *PR News*, (Jan. 15, 1999).

Lin, Weiyang, et al., "Efficient Adaptive-Support Association Rule Mining for Recommender Systems", *Data Mining and Knowledge Discovery*, 6(1), (2001),83-105.

O'Leary, Mick, "Product Review Net: Web solution to common consumer need", *Database*, 21(4), (1998),96-8.

Pinker, E. J., et al., "Managing online auctions:Current business and research issues.", *Institute for Operations Research Management Services*, (Nov. 2003).

* cited by examiner

Item #330390395

Jewelry, Gemstones:Beads:Findings
Bidding is closed for this item.

| | | |
|---|---|---|
| | Currently | $1.00 |
| | Quantity | 1 |
| Description | Time left | Auction has ended. |
| | Started | May-11-00 16:06:38 PDT |
| | Ends | May-11-00 16:07:36 PDT |
| Leave Feedback (to seller) (to bidder) | Seller (Rating) | krauss@billpoint.com(0) (view comments in seller's Feedback Profile) (view seller's other auctions) (ask seller a question) |
| If you are the seller or the high bidder- now what? | High bid | jeff3@billpoint.com (0) |
| | Payment | See item description for payment methods accepted Online Payments [VISA] [M/C] [DISC] Credit Card, [//] Electronic Check To use Online Payments *High Bidder Click here ~1122 *Seller Click here ~1124  1110  1120 |
| | Shipping | Will ship to United States only, See item description for shipping charges |
| | Relist item | Seller: Didn't sell your item the first time? We will refund your relisting fee if it sells the second time around. Relist this item. |

Seller assumes all responsibility for listing this item. you should contact the seller to resolve any questions before bidding. Auction currency is U.S. dollars ($) unless otherwise noted.

FIG. 11

| SECURE ONLINE PAYMENTS 🔒 | Help |

Seller: krauss@billpoint.com     Total Amount
                                          Due:          $1.50
Item: Test Item
Name:                                      Item #:       33039035

Enter New Credit Card Information and Place Your Order — 1610

Please enter your credit card number and billing information into the secure form below. This information is kept confidential and will not be seen by the seller.

Enter your credit card information — 1620

All entries are required.

Credit card: [VISA ▼]
Card Number: [ ]

Expiration: [May ▼] [2002 ▼]

Please enter your billing information as it appears on your credit card statement:

Name: [ ] [ ] [ ]
Billing Address: [ ]
[ ]
City: [ ]
State/Province/Region: [ ]
Please enter 2 letter state code for US addresses (Ex, CA, RI)
Zip/Postal Code: [ ]
Country: [United States ▼]
Primary Phone Number: [ ]
Please include area code (Example: 123-456-7891)
E-Mail Address: jeff3@billpoint.com Click "CONTINUE" to enter shipping information--your credit card is NOT charged at this time. To exit, click "CANCEL"

( CANCEL ) ( CONTINUE )

FIG. 16

SECURE ONLINE PAYMENTS 🔒        Help    1700

Seller: toystoystoys      Total Amount Due: $30.50
Item Name: Jar Jar Binks Doll      Item #: 504057950

Checking Account Information

Please enter your payment information into the secure form below. This information is kept confidential and will not be seen by the seller. If you have questions on Electronic Checks, please see the Electronic Check FAQ for Buyers.

Enter your Checking Account Information

Please enter the checking account from which you would like to make this purchase. You can find the Bank Routing # and the Checking Account # on the bottom of the check, as shown in the example below.

Bank Name: ~1710    Bank Routing #: ~1720    Checking Account #: ~1730

Sample Check (lower left corner)

1740    ⑈7398811823⑈ ( 632 ) ⑇0173136142⑇

The Bank Routing # is    The check # should match    The Checking Account # is usually
9 digits between the    the # in the upper-right corner    to the left of ⑈ if check # is left
⑈ ⑈ symbols                                            of account #, ignore check #.

Note: These three sets of numbers may appear in a different order on your check.

Enter your Name and Checkin Account Address ~1750

Please enter your name and the address where you receive statements for your checking account.

Name: [ ] [ ] [ ]
Street Address: [ ]
[ ]
City: [ ]
State: [ ]
Zip Code: [CHOOSE ▼]
Primary Phone Number: [ ]
Please include area code (Example: 123-456-7891)

Enter a Secondary Form of Identification ~1760

To protect the security of your checking account, you must provide a secondary form of identification. Please enter EITHER your Driver's License information OR your Social Security Number.

Driver's License:    State Issued:    Date of Birth:
[ ]    [CHOOSE ▼]    [ ]
                                         (Example: 05/11/74)
1762    OR    1764    1766

Social Security Number:
[ ]
1768

1770

Click "CONTINUE" to enter your shipping information--your checking account is NOT charged at this time. To exit, click "CANCEL"

(CANCEL) (CONTINUE)

FIG. 17

METHOD AND APPARATUS FOR FACILITATING ONLINE PAYMENT TRANSACTIONS IN A NETWORK-BASED TRANSACTION FACILITY USING MULTIPLE PAYMENT INSTRUMENTS

This present application claims the benefit of the filing date of U.S. provisional patent application No. 60/190,420, filed Mar. 17, 2000.

FIELD OF THE INVENTION

The present invention relates generally to the field of e-commerce and, more specifically, to facilitating online payment transactions in a network-based transaction facility using multiple payment instructions.

BACKGROUND OF THE INVENTION

For users of a network-based transaction facility, a reliable and convenient payment mechanism is particularly important for enhancing user trust in the transaction facility. A typical network-based transaction facility, however, does not ensure the expedient and secure completion of payment transactions. Instead, payment transactions between traders of an online trading community are typically conducted in a conventional, time-consuming manner using paper checks and money orders. Accordingly, such payment transactions delay payments to sellers and delivery of purchased goods to buyers. In addition, sellers are expected to bear the risk of bounced checks and buyers are running the risk of not receiving the goods after sending the money.

The above problems are typically faced by individuals or small businesses who cannot afford to build or buy the infrastructure to accept credit card payments from buyers in the network-based transaction facility. However, even a seller who does accept credit card payments can still lose those buyers who appreciate the convenience of online payments but do not have access to credit cards. In addition, a buyer may prefer not to disclose his or her credit card information over the Internet in general, or to a certain seller in particular. Further, credit card payments may not always be desirable for sellers because of their charge back recourse to buyers.

Therefore, it will be advantageous to provide traders with an efficient and secure mechanism for facilitating online payment transactions via a variety of payment instruments.

SUMMARY OF THE INVENTION

A method and apparatus for facilitating online payment transactions between participants in a network-based transaction facility are described. In one embodiment, user interface information is communicated to a first participant via a communications network. The user interface information identifies various payment instruments available for processing the online payment transactions in the network-based transaction facility. Further, payment option information is received from the first participant via the communications network. The payment option information indicates the willingness of the first participant to accept a payment from a second participant via one or more of the various payment instruments. This payment option information is passed to the second participant via the communications network. Afterwards, personal billing information is accepted from the second participant via the communications network to facilitate an online payment transaction between the first participant and the second participant. The personal billing information concerns a payment instrument selected by the second participant from the payment instruments specified by the first participant.

BRIEF DESCRIPTION OF THE DRAWINGS

The present invention is illustrated by way of example and not limitation in the figures of the accompanying drawings, in which like references indicate similar elements and in which:

FIGS. 10-19 are exemplary representations of various interfaces included in the sequence of interfaces shown in FIG. 8.

DETAILED DESCRIPTION

A method and apparatus for facilitating online payment transactions in a network-based transaction facility using various payment instruments are described. In the following description, for purposes of explanation, numerous specific details are set forth in order to provide a thorough understanding of the present invention. It will be evident, however, to one skilled in the art that the present invention may be practiced without these specific details.

System for Processing Online Payment Transactions

Figure 1:
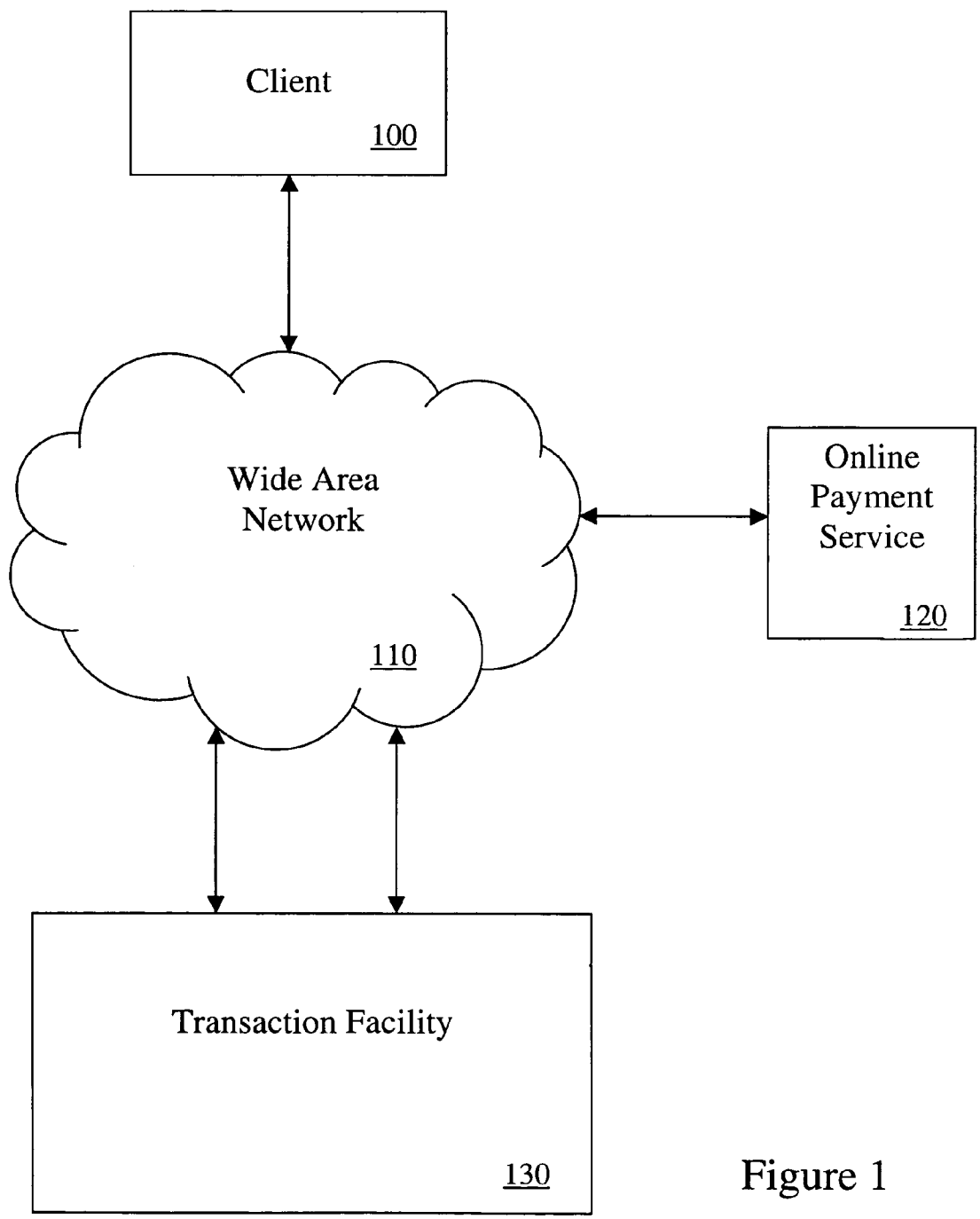
FIG. 1 is a block diagram of one embodiment of a system for processing online payment transactions between participants in a network-based transaction facility.

FIG. 1 is a block diagram of one embodiment of a system for processing online payment transactions between participants in a network-based transaction facility. In this embodiment, a client 100 is coupled to a transaction facility 130 via a communications network, including a wide area network 110 such as, for example, the Internet. Other examples of networks that the client may utilize to access the transaction facility 130 include a local area network (LAN), a wireless network (e.g., a cellular network), or the Plain Old Telephone Service (POTS) network.

The client 100 represents a device that allows a user to participate in a transaction facility 130. The transaction facility 130 handles all transactions between various participants including the user of the client computer 100. In one embodiment, the transaction facility 130 may be an online auction facility represented by an auction web site visited by various participants including the user of the client computer 100. An exemplary auction facility is described in greater detail in conjunction with FIG. 2. Alternatively, the transaction facility 130 may be an online retailer or wholesaler facility represented by a retailer or wholesaler web site visited by various buyers including the user of the client computer 100. In yet other embodiments, the transactions facility 130 may be any other online environment used by a participant to conduct business transactions.

The transaction facility 130 is coupled to an online payment service 120. In one embodiment, the transaction facility 130 is coupled to the online payment service 120 via a communications network such as, for example, an internal network, the wide area network 110, a wireless network (e.g., a cellular network), or the Plain Old Telephone Service (POTS) network. Alternatively, the online payment service 120 is integrated with the transaction facility 130 and it is a part of the transaction facility 130. The online payment service 120 is also coupled to the client 100 via any of the described above communications networks. The online payment service 120 is a service for enabling online payment transactions between participants of the transaction facility 130, including the user of the client computer 100.

In one embodiment, the online payments service 120 enables the participants to make online payments in the course of business conducted in the transaction facility 130 using multiple payment instructions. These payment instructions may include, for example, credit cards, debit cards, wire transfers, electronic funds transfers (EFT), transfers from internal accounts within the transaction facility 130 or the online payment service 120, loan financing, lines of credit, coupon or gift certificates, etc. In this embodiment, the transaction facility 130 facilitates business transaction between the user of the client 110 and other participants. The client t110 presents user interface information to the user. The user interface information identifies multiple payment instruments available for processing payment transactions pertaining to corresponding business transactions.

In one embodiment, the user selects one or more payments instruments from the available payments instruments. The client 110 then communicates payment option information of the user to the transaction facility 130. The payment option information indicates the willingness of the user to accept payments from other participants via the selected payment instruments. The online payment service 120 receives the payment option information from the transaction facility 130, communicates the payment option information to a participant conducting business with the user, and enables the participant to choose a preferred instrument from the payment instruments selected by the user. The online payment service 120 then accepts personal billing information concerning the preferred payment instrument from the participant to facilitate the payment transaction between the participant and the user.

Transaction Facility

Figure 2:
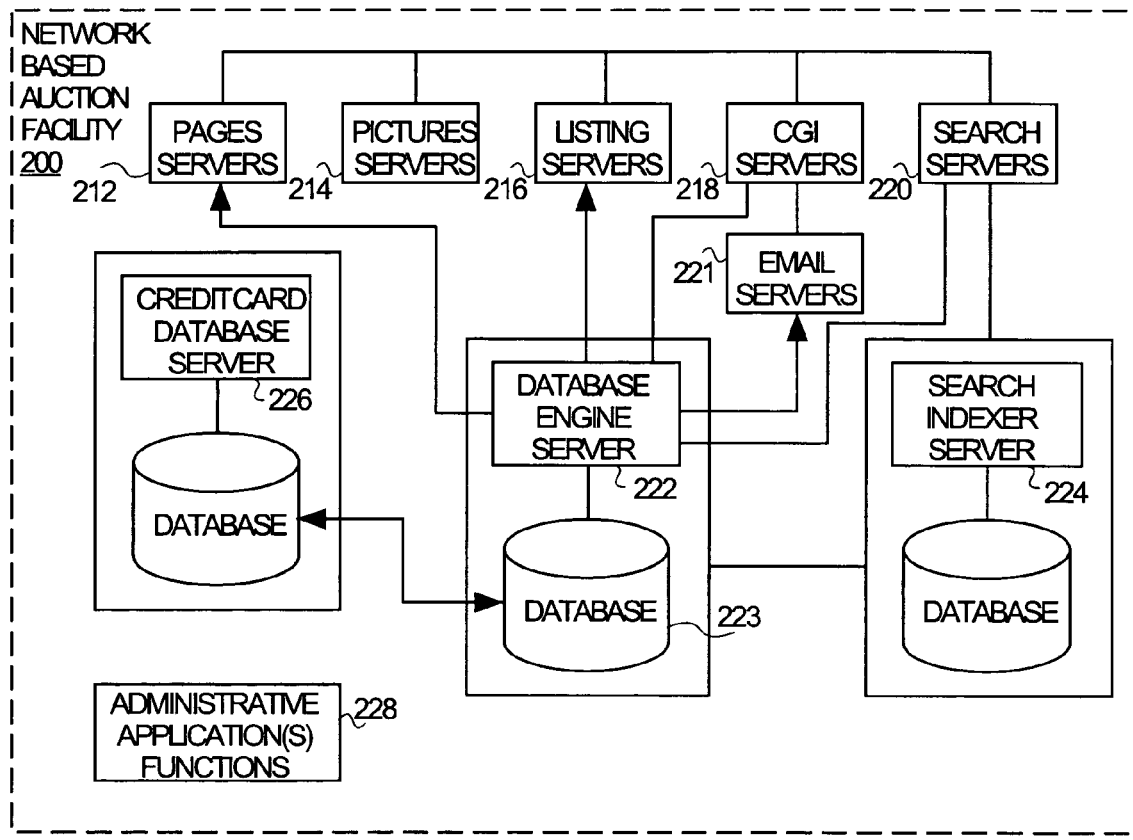
FIG. 2 is a block diagram of one embodiment of a network-based transaction facility.

FIG. 2 is a block diagram illustrating an exemplary network-based transaction facility in the form of an Internet-based auction facility 200. While an exemplary embodiment of the present invention is described within the context of an auction facility, it will be appreciated by those skilled in the art that the invention will find application in many different types of computer-based, and network-based, commerce facilities.

The auction facility 200 includes one or more of a number of types of front-end servers, namely page servers 212 that deliver web pages (e.g., markup language documents), picture servers 214 that dynamically deliver images to be displayed within Web pages, listing servers 216, CGI servers 218 that provide an intelligent interface to the back-end of facility 210, and search servers 220 that handle search requests to the facility 10. E-mail servers 221 provide, inter alia, automated e-mail communications to users of the facility 200.

The back-end servers include a database engine server 222, a search index server 224 and a credit card database server 226, each of which maintains and facilitates access to a respective database.

The Internet-based auction facility 200 may be accessed by a client program, such as a browser (e.g., the Internet Explorer distributed by Microsoft Corp. of Redmond, Wash.) that executes on the client computer 100 and accesses the facility 200 via the communications network 110.

Online Payment Service

Figure 3:
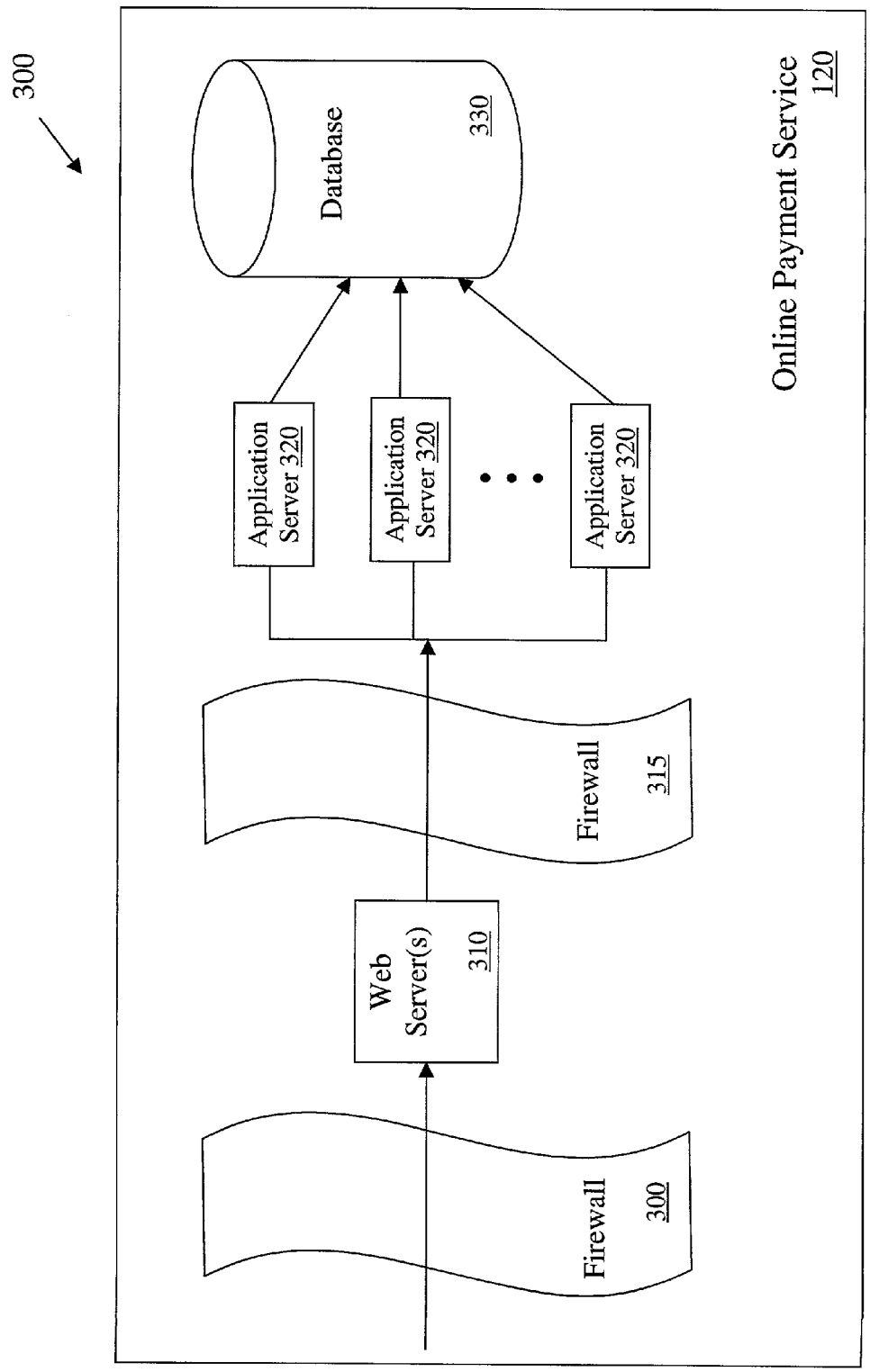
FIG. 3 is a block diagram of one embodiment of an online payment service.

FIG. 3 is a block diagram of one embodiment of an online payment service 120. The online payment service 120 includes a firewall 300, one or more web servers 310, a firewall 315, a set of application servers 320, and one or more databases 330. The firewall 300 isolates the online payment service 120 from external Internet accesses. The firewall 310 enhances security within the online payment service 120 by preventing internal access to information stored in the database 330. The only access permitted to the database is from applications servers 320, making valid database requests.

The web servers 310 facilitate the exchange of information between the online payment service 120, the transaction facility 130 and the participants of the transaction facility 130, including the user of the client 100. In one embodiment, the web servers 310 encrypt data outgoing from the online payment service 120 using a secure protocol (e.g., a secure socket layer (SSL) protocol, a secure HTTP protocol, etc.). In one embodiment, a digital signature mechanism is implemented to prevent tampering of data prior to the encryption stage.

The application servers 320 handle various tasks executed within the online payment service 120. Each application server 320 is responsible for a certain pre-assigned task. These tasks may include, for example, executing payment transactions, registering participant accounts, maintaining account statuses for each user, providing customer service, delivering emails, providing analysis (e.g., risk analysis) and reporting, processing electronic fund transfers EFTs, and other application services. The applications servers 320 access the database 330 to enter or retrieve various data. The database 330 is described in greater detail below in conjunction with FIG. 6.

In one embodiment, the online payment service 120 is coupled, via a network, to multiple external payment processors to complete various types of online payment transactions. For example, the online payment service 120 may be coupled to a credit card processor to process credit card payments. The online payment service is 120 may also by coupled to an EFT processor to process electronic checks and money order payments. Other external payment processor may include, for example, a wire transfer processor, a loan financing processor, a line of credit processor, a coupon or gift certificate processor, etc.

Figure 6:
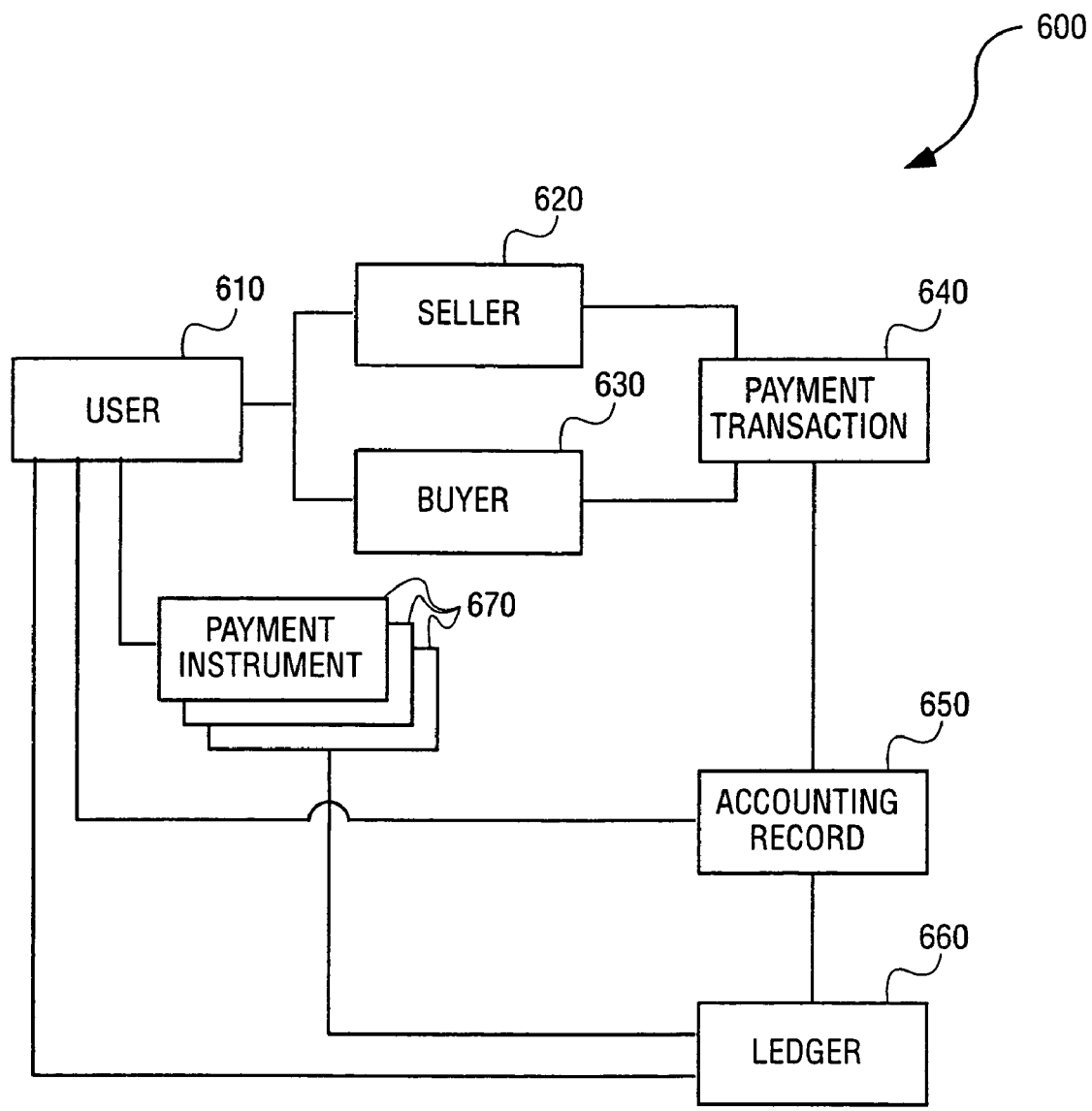
FIG. 6 is a block diagram of one embodiment of a database maintained by an online payment service.

FIG. 6 is a database diagram illustrating an exemplary database 600 supported by the online payment service 120. The database 600 may, in one embodiment, be implemented as a relational database, and includes a number of tables having entries, or records, that are linked by indices and keys.

In an alternative embodiment, the database 600 may be implemented as collection of objects in an object-oriented database.

Central to the database 600 is a user table 610, which contains a record for each user of the online payment service 120. A user may operate as a seller, buyer, or both, within the transaction facility 130. A seller table 620 is linked to the user table 610 and includes more detailed information about each seller. A buyer table 630 which is also linked to the user table 410 includes detailed information about each buyer. The database 600 also includes payment instruments tables 670 that may be linked to the user table 610. Each payment instrument table 670 pertains to an individual payment instrument available for use in the transaction facility 130. Available payment instruments may include, for example, credit cards, debit cards, automated clearing house (ACH) transfers using electronic checks and money orders, wire transfers, transfers from an internal account within the online payment service 120 or the transaction facility 130, loan financing, lines of credit, coupons or gift certificates, etc. Each payment instrument table 670 includes corresponding billing information provided by a user. A user record in the user table 610 may be linked to a payment instrument record in multiple payment instrument tables 670 if the user provides billing information on more than one payment instrument.

The database 600 also includes a payment transaction table 640 which is linked to the seller table 620 and the buyer table 630. The payment transaction table 640 contains information on each financial exchange between a buyer and a seller. A payment transaction in the transaction table 640 may be represented by one or more accounting records in an accounting record table 650. The accounting records support an accounting system of the online payment service 120 and contain various accounting information, such as, for example, information on debits and credits to buyers, sellers, the online payment service, or other third parties participating in payment transaction. A payment transaction that does not corresponds to any accounting record may indicate that the transaction was not completed successfully (e.g., the buyer's credit card was invalid).

A ledger table 660 is linked to the accounting record table 650, the user table 610 and the payment instrument tables 670. A ledger record contains information on an actual fund transfer between a user and the online payment service 120. The funds transfer may be a debit (e.g., a charge to a buyer's credit card) or a credit (e.g., a disbursement to a seller's checking account). The funds transfer is conducted through a particular payment instrument selected by the buyer and seller and approved by the online payment service 120 in a manner described in more detail below.

One embodiment of an architecture of the online payment service 120 will now be described in more detail. In this embodiment, the online payment service 120 supports a large number of buyers and sellers who are distributed across the globe, executing transactions at any time of day and night. In order to provide stable physical environment and reliable application architecture, online payment service clusters are installed at several different geographical locations. If a single data center location goes down, transaction volume can be processed by clusters at the remaining locations. Each cluster, in turn, may consist of multiple machines with redundant service.

Figure 4:
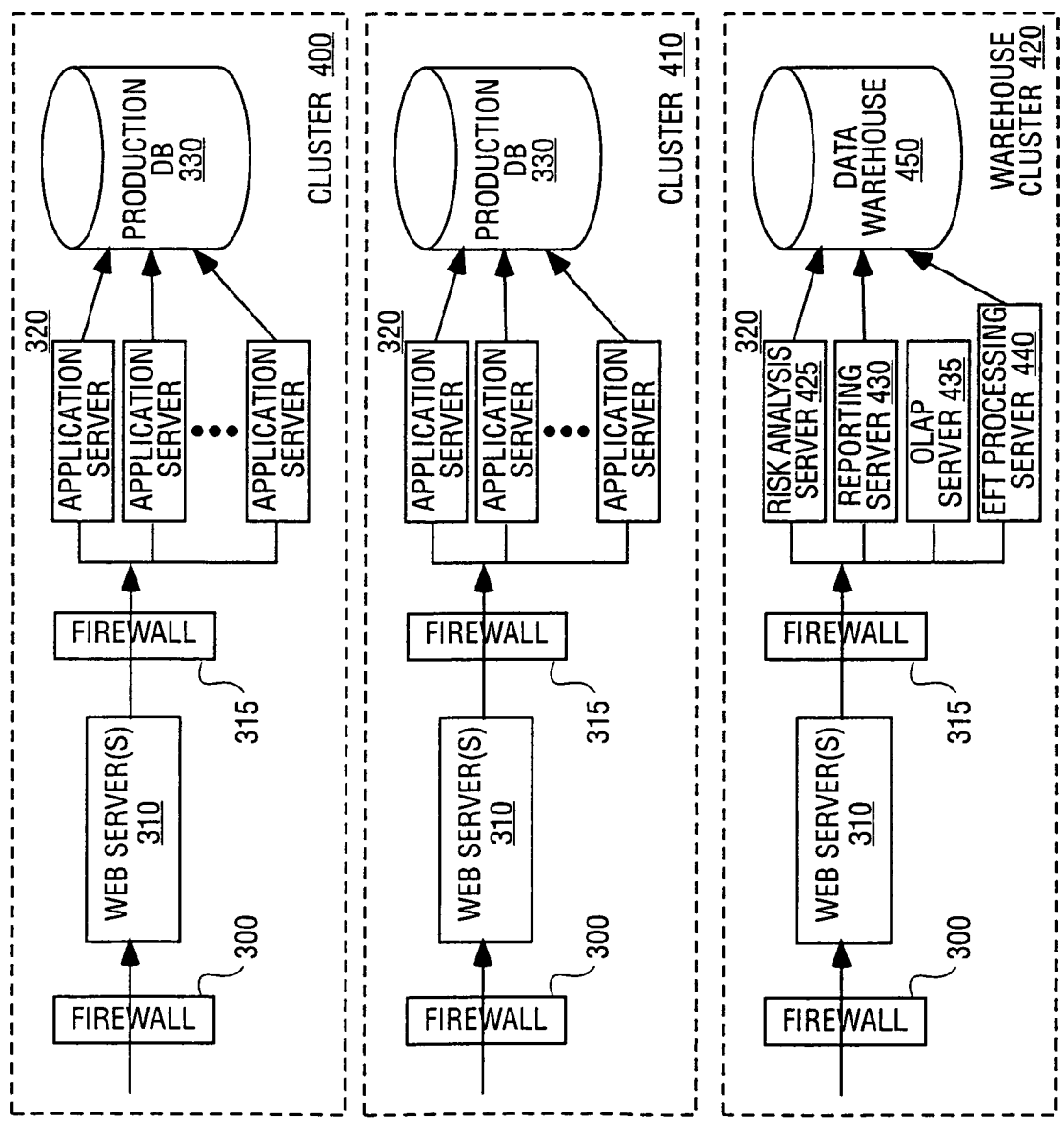
FIG. 4 is a block diagram of an exemplary online payment service supporting multiple data centers.

FIG. 4 is a block diagram of an exemplary online payment service 120 supporting multiple data centers. In this embodiment, clusters 400, 410 and 420 reside in different data centers. The same web servers 310 and application servers 320 are included in both clusters 400 and 410. The application servers 320 of the clusters 400 and 410 perform transaction management functions, such as, for example, transaction execution, account registration, account status, customer service, e-mail delivery, etc. In one embodiment, in each of the clusters 400 and 410, multiple instances of every application server run in parallel to balance the system load between the different functions. Application servers can be installed on different physical machines to increase reliability of the system. In one embodiment, each of the clusters 400 and 410 has external connections with one or more payment processors (e.g., a credit card processor, an EFT processor, a wire transfer processor, etc).

In one embodiment, each of the clusters 400 and 410 includes a production database 330. Shared data (e.g., buyer and seller profile information) in the production database 330 may be dynamically replicated to both data centers. Transaction data (e.g., current account statement information) may not need to be replicated as it can be constructed in a variety of other ways using the production data. For example, upon a user request for an online account statement, a query (e.g., an SQL query) may be run to build a complete transaction record.

In one embodiment, analysis and reporting functions may be separated from the transaction activity because these functions are time consuming. That is, analysis and reporting functions may be executed by the warehouse cluster 420 located separately from the clusters 400 and 410. The analysis and reporting functions may include, for example, risk or fraud analysis, standard reporting, online analytical processing (OLAP) providing database indexing to enhance quick access to data EFT processing, etc. The analysis and reporting functions may be carried out against a separate data warehouse system, such as a data warehouse 450. Data pertaining to the analysis and reporting may be extracted from the production database 330 at predefined time intervals and stored in the data warehouse 450. As a result, user transaction activity is not impacted by execution of time-consuming analysis and reporting functions.

Multiple Payment Instruments

In order to provide participants of the transaction facility 130 with an effective and secure mechanism of conducting online payment transactions, one embodiment of the present invention proposes a method and system whereby the participants may conveniently use multiple payment instruments to make online payments for products obtained in the course of their commercial activity in the transaction facility 130.

Figure 5:
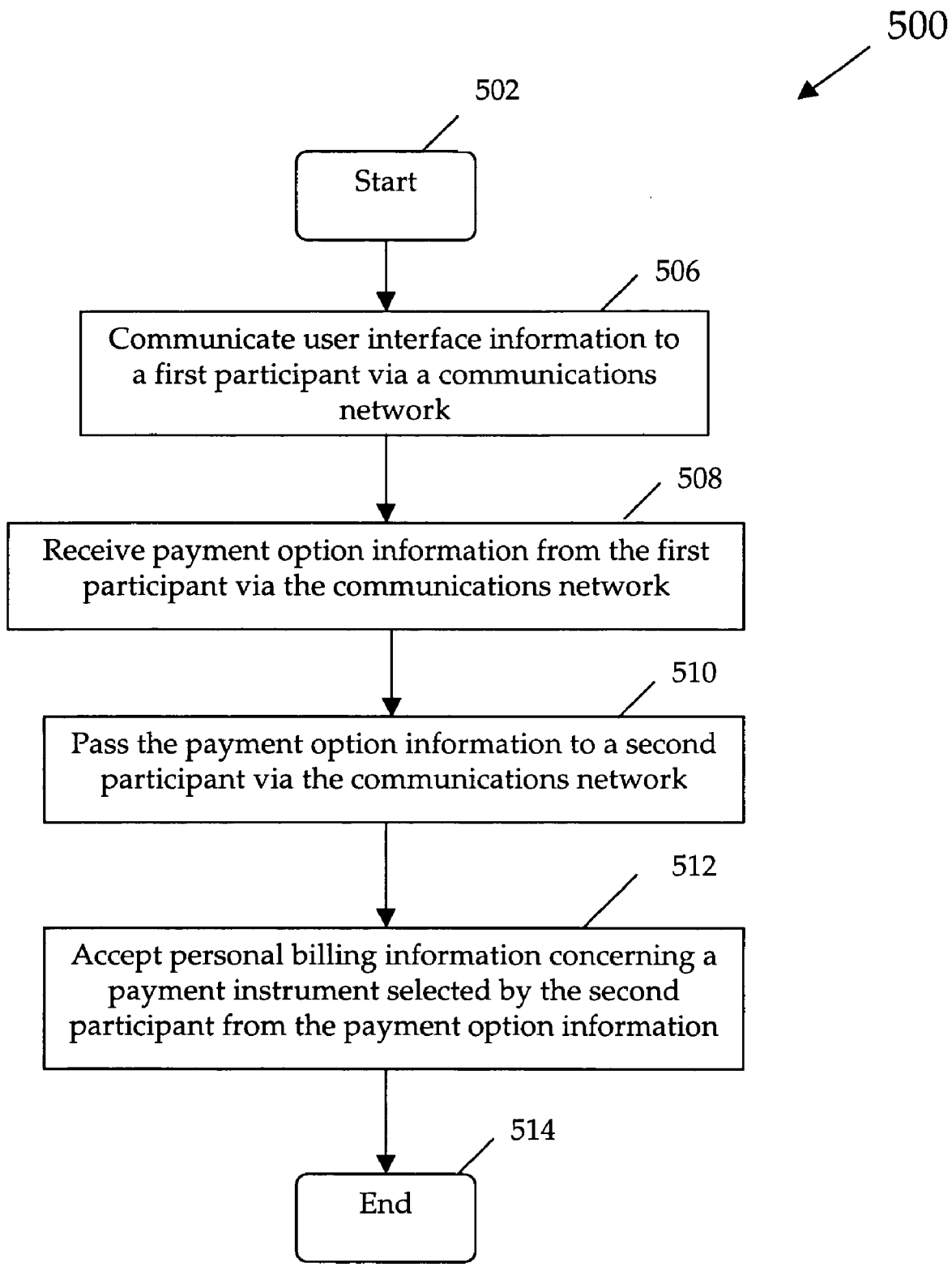
FIG. 5 is a flow chart of an exemplary method for facilitating online payment transactions using multiple payment instruments.

FIG. 5 is a flow chart illustrating an exemplary method 500 of facilitating online payment transactions using multiple payment instruments. The method 500 may be performed by processing logic, which may comprise hardware, software, or a combination of both. The processing logic may be either in the online payment service 120, or partially or entirely in a separate device and/or system(s).

Referring to FIG. 5, the method 500 begins with the online payment service 120 communicating user interface information to a first participant via a communications network (processing block 506). The user interface information identifies multiple payment instruments available for processing payment transactions in the transaction facility 130.

At processing block 508, processing logic in the online payment service 120 receives payment option information from the first participant via the communications network. The payment option information indicates a willingness of the first participant to accept payments from a second participant through one or more available payment instruments. As described above, available payment instruments may include, for example, credit cards, debit cards, wire transfers, electronic checks and money orders. In addition, the online payment service 120 may permit payments through direct transfers from an internal account which is maintained for a participant within the transaction facility 130 or the online payment service 120.

In one embodiment, payment instruments may also include loan financing and lines of credit. In this embodiment, the online payment service 120 may cooperate with a third party processor (e.g., a financial institution) to process loan financing and to create or extend a line of credit for a participant. Other payment instruments may include coupons and gift certificates, or any other U.S. or international vehicles. In the cases of coupons and gift certificates, the online payment service 120 (in cooperation with a third party or internally) determines whether a coupon or a gift certificate is valid.

Next, processing logic in the online payment service 120 passes the payment option information to the second participant via the communications network (processing block 510). Afterwards, at processing block 512, processing logic in the online payment service accepts personal billing information of the second participant to facilitate a payment transaction between the first participant and the second participant. The personal billing information transferred over the communications network pertains to a payment instrument selected by the second participant from the payment instruments specified by the first participant.

In one embodiment, processing logic in the online payment system 120 communicates the personal billing information of the second participant, via the communications network, to a financial institution to process the payment transaction. Alternatively, the personal billing information may be processed internally (e.g., when a payment is made using a direct transfer from an internal account within the online payment system 120 or the transaction facility 130). Afterwards, when the payment transaction completes, the first participant is notified. In one embodiment, notification may be sent immediately after accepting the personal billing information (e.g., when a payment is made using a credit card). Alternatively, notification is sent after a certain time period expires (e.g., when a payment is made using an electronic check).

In one embodiment, at various stages of the payment transaction between the first participant and the second participant, risk involved in the payment transactions is evaluated by a risk analysis system of the online payment system 120. The various stages may include, for example, the time the payment transaction is initiated, the time either the first or second participant registers with the online payment service 120, the time the first participant provides invoice information, the time the second participant provides personal billing information pertaining to a particular payment instrument, the time funds are disbursed to the first participant, etc. Based on the involved risk, the payment transaction between the first and second participants may be interrupted or restricted (e.g., preventing a participant from accepting or paying with a certain payment instrument). The risk analysis system is described in greater detail below in conjunction with FIG. 7.

In one embodiment, processing logic in the online payment service 120 accepts multiple payments owed to the first participants by other participants in the course of business transactions conducted by the first participant in the transaction facility 130. The multiple payments are accepted via the communications network and may be made using various payment instruments. Next, processing logic in the online payment service 120 accumulates these payments over a period of time and then distributes a single disbursement which includes the accumulated payments to the first participant.

In one embodiment, the online payment service 120 accepts a payment from the second participant in one currency and distributes the payment to the first participant in different currency. The above online payment options address time-consuming and unreliable paper-based payment methods and provide an efficient and secure mechanism to conduct payment transactions within the transaction facility 130.

Figure 7:
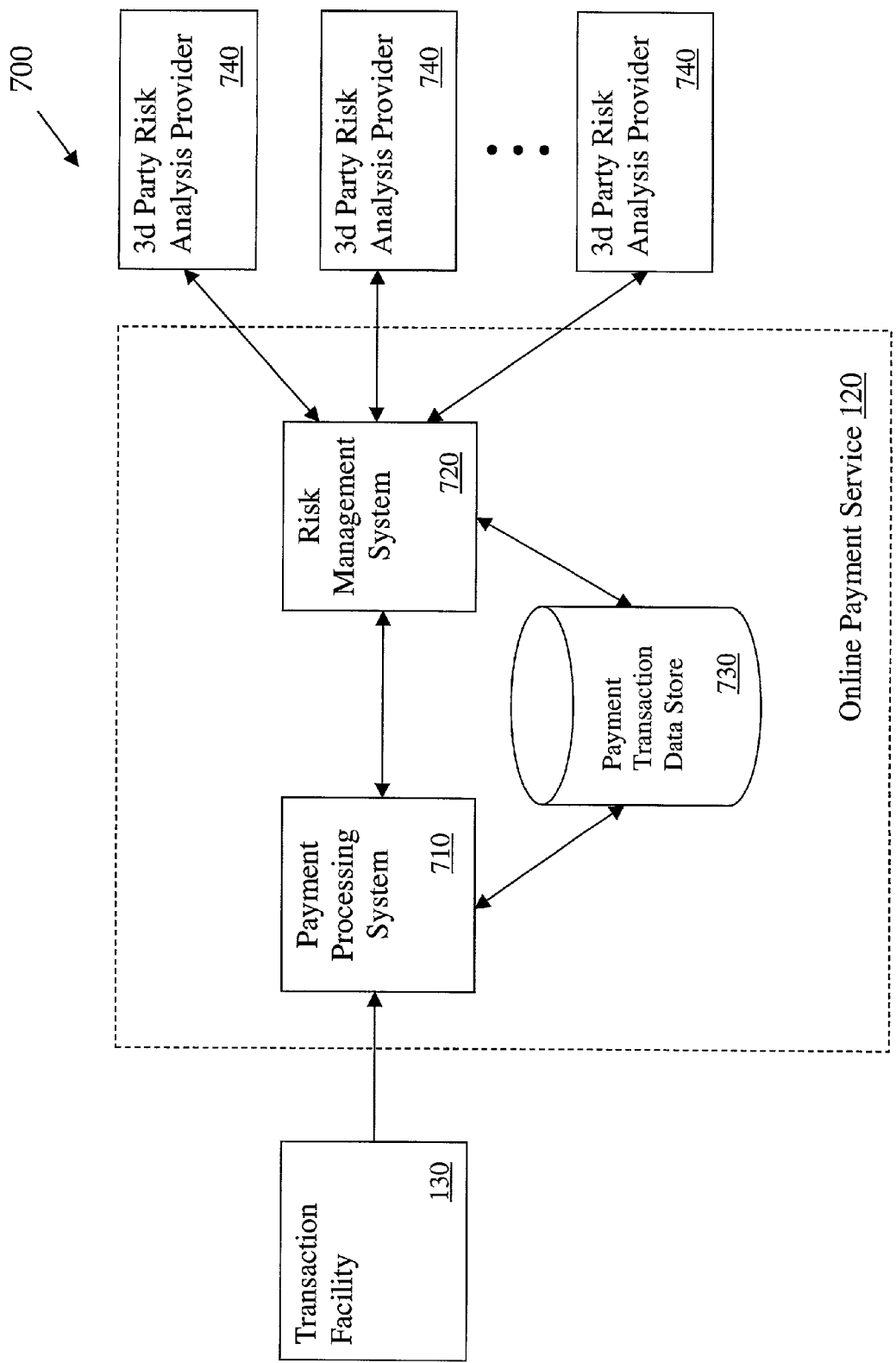
FIG. 7 is a block diagram of one embodiment of a process flow for evaluating risks involved in an online payment transaction.

FIG. 7 is a block diagram of one embodiment of a process flow for evaluating risks involved in an online payment transaction. As described above, the involved risks are evaluated at various stages of the payment transaction. The involved risks may concern, for example, a buyer's ability to pay, a likelihood that a buyer or a seller may be fraudulent (e.g., a buyer uses a stolen credit card, or a seller lists goods for sale online with no intent or ability to deliver the purchased goods), a seller's ability to fulfill purchase orders promptly, etc. Based on the risk evaluation, the online payment service 120 may reject or restrict a payment transaction between a buyer and a seller in a manner described below. In one embodiment, the risk evaluation is performed in real time and enables an uninterrupted processing of the payment transaction.

In one embodiment, the online payment service 120 contains a payment processing system 710 and a risk management system 720. The payment processing system 710 is responsible for executing payment transactions. Specifically, the payment processing system 710 receives information from the transaction facility, stores some or all of this information for historical purposes in a local database (i.e., a payment transaction data store 730), and determines what information to pass to the risk management system 720. The risk management system 720 utilizes this information to determine a risk level involved in the payment transaction. In one embodiment, the risk management system 720 may also use input from one or more third party risk analysis providers 740 to evaluate the risk level of the payment transaction. The results of the evaluation are passed back to the payment processing system 710 which continues processing the payment transaction based on the evaluation results.

In one embodiment, payment transactions are initiated in the transaction facility 130. The transaction facility 130 passes a variety of information concerning a payment transaction and its participants (a buyer and a seller) to the payment processing system 710. The payment transaction information may include, for example, a payment transaction amount, currency in which the payment transaction is to be conducted, description of the goods or services being exchanged, etc. The participant information may include, for example, identifying information of both a buyer and a seller (e.g., names, identification codes, contact information) and information pertaining to their business participation in the transaction facility 130. For instance, the transaction facility 130 may pass to the payment processing system 710 information on how long both the buyer and the seller have been registered with the transaction facility 130, their historical business activity within the transaction facility 130 (e.g., number of prior transactions, gross sales, average amount of a sale), user classification schemes and peer rating schemes used in the transaction facility 130 (e.g. user feedback ratings), third party trust ratings carried out by the transaction facility 130 (e.g. credit reports), etc. It should be noted that a wide variety of information other than the information described above may be passed to the payment processing system 710 from the transaction facility 130 for evaluating potential risk involved in the payment transaction.

In another embodiment, the payment processing system 710 itself may initiate a payment transaction (e.g., if the payment processing system 710 is notified that a buyer and a seller agreed that a payment would take place on a future date). In this embodiment, the payment processing system 710 then requests relevant information (including any or all of the above information) from the transaction facility 130.

The payment processing system 710 passes any or all of the above information to the risk management system 720. In addition, the payment processing system 710 may pass certain internal transaction data (e.g., response codes from a credit card processor) to the risk management system 720. The risk management system 720 uses the above information to determine the risk level of the payment transaction. In addition, the risk management system 720 may include in its analysis data stored in the payment transaction data store 730 (e.g. historical transaction activity of the seller and the buyer) and information collected by system operation staff related to either the buyer or the seller (e.g., customer service responses, "blacklists" identifying fraudulent customers, etc.).

In one embodiment, the risk management system 720 also includes in its analysis external risk analysis results. In this embodiment, the risk management system 720 may request one or more third party risk analysis providers 740 to provide an additional evaluation of the risk involved in the payment transaction. For instance, a financial institution may provide additional levels of screening to identify potentially fraudulent participants. The risk management system 720 may transmit to the third party risk analysis providers 740 any or all of the information collected for the payment transaction. The third party risk analysis providers 740 analyzes this information and information obtained from their own sources to determine a risk assessment for the payment transaction. The risk assessment information is then sent back to the risk management system 720.

Based on the information received from various external and internal sources, the risk management system 720 determines the risk level of the payment transaction using a scoring algorithm. It should be noted that any scoring algorithm known in the art may be used by the risk management system 720 without loss of generality. The risk management system 720 produces a consolidated risk response and passes it to the payment processing system 710. The risk response may include, for example, information indicating that service should be denied to a participant due to high likelihood of fraud, information on a recommended service fee for processing the payment transaction, information on recommended restrictions on payment instruments to be used by either the buyer or the seller, information on recommended restrictions on disbursing funds to the seller, etc.

The payment processing system 710 receives the risk response from the risk management system 720 and makes a final determination concerning the payment transaction. That is, the payment processing system 710 may reject the payment transaction (or deny service to either the buyer or the seller entirely), process the payment transaction without any changes, or restrict the timing and/or the manner in which the payment transaction is conducted. For example, the payment processing system 710 may limit payment instruments offered for use in the payment transaction, may assign or modify a fee for processing the payment transaction, may restrict the time or the manner in which funds are disbursed to the seller, etc.

User Interfaces

Figure 8:
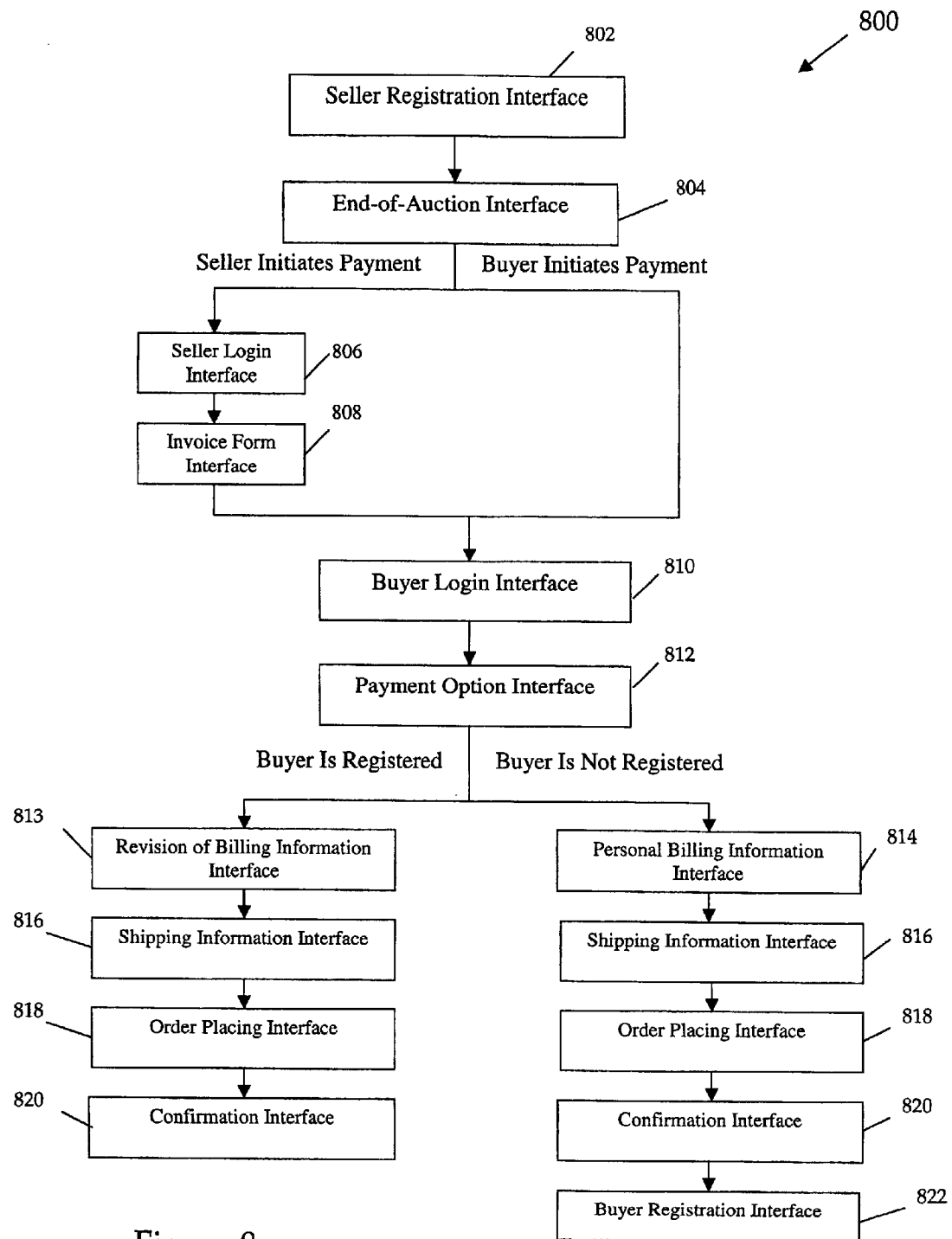
FIG. 8 is a block diagram of one embodiment of an interface sequence implemented to facilitate online payment transactions through multiple payment instruments.

Functions of the online payment service 120 pertaining to payments through multiple payment instruments will now be described within the context of user interfaces, according to one embodiment of the present invention. FIG. 8 shows an interface sequence 800, according to an exemplary embodiment of the present invention, that may be implemented by the transaction facility 130 and the online payment service 120 for the purposes of providing multiple online payment options to participants in the transaction facility 130. Exemplary representations of the various interfaces included within the sequence 800 are shown in FIGS. 10-19. While exemplary interfaces are described within the context of an auction facility, it will be appreciated by those skilled in the art that they may be implemented in many different types of computer-based, and network-based, transaction facilities.

The interface sequence 800 commences with a seller registration interface 802 through which a seller may specify what online payment instruments the seller will accept from various buyers. The seller registration interface 802 is generated by the transaction facility 130 and may be accessed at any time during a business transaction (e.g., during an auction) or upon an end of the business transaction (e.g., upon en and of auction). The seller needs to go through the seller registration interface 802 only once unless the seller wants to modify the payment instruments specified initially.

Upon the end of the business transaction, an end of business transaction interface 804 is displayed by the transaction facility 130. The end of business transaction interface 804 identifies a seller and a buyer and the payment instruments acceptable to the seller. If the payment transaction is initiated by the seller, the seller is then presented with a seller login interface 806 which allows the seller to login to the online payment service 120 by entering the seller's password. Subsequently, the seller is presented with an invoice form interface 808. The invoice form interface 808 displays an explanation of the payment process and requests the seller to enter the invoice terms.

After the seller confirms that the invoice terms are correct, the buyer receives an email with a link to a buyer login interface 810. Alternatively, if the payment transaction is initiated by the buyer, the invoice is not generated and the buyer does not need to wait for the above email. Instead the buyer can directly access the buyer login interface 810 which enables the buyer to login to the online payment service 120.

Next, the buyer is presented with a payment option interface 812 which allows the buyer to select a particular payment instrument for use in this payment transaction. In addition, the payment option interface 812 enables the buyer to avoid entering the buyer's personal billing information in a personal billing information interface 814 if the buyer has previously registered with the online payment service 120. If so, the buyer is presented with a revision of billing and shipping information interface 813 and then with an order placing interface 818. By clicking a place order button on the order placing interface 818, the buyer authorizes the online payment service to execute the payment transaction (e.g., charging the buyer's credit card, initiating an electronic funds transfer, etc.). Further, the buyer is presented with a confirmation interface 820 confirming that the buyer's purchase is complete. In case of an electronic funds transfer, the confirmation interface 820 notifies the buyer that the online payment service 120 has initiated the buyer's electronic check payment.

If the buyer has not previously registered with the online payment service 120, the buyer is presented with the personal billing information interface 814 which requests the buyer to enter billing information pertaining to the payment instrument selected by the buyer. Next, the buyer is presented with a shipping information interface 816 which requests the buyer to enter shipping information for this order and then with an order placing interface 818 and then with the confirmation interface 820. Afterwards, the buyer is invited to register with the online payment service 120 using a buyer registration interface 822. By registering, the buyer permits the online payment service 120 to store the buyer's personal billing information so that the buyer does not need to enter it every time the buyer pays for the goods through a corresponding payment instrument. The personal billing information of the buyer is kept confidential and is not communicated to the seller.

Figure 9:
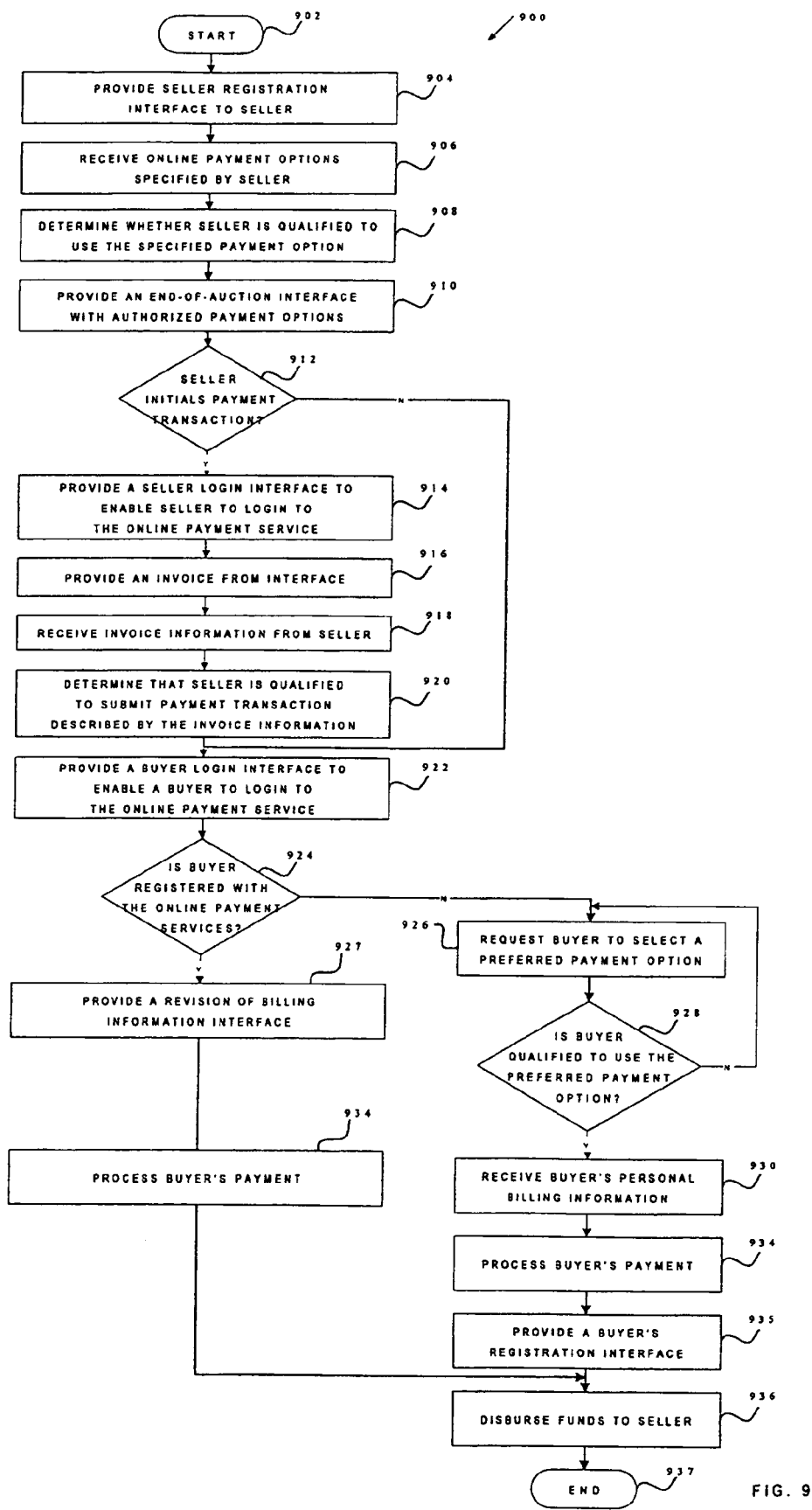
FIG. 9 is a flow chart of an exemplary method for facilitating online payment transactions through multiple payment instruments using risk analysis.

The interfaces 802-820 will now be described within the context of a method 900, according to one embodiment of the present invention, of facilitating payment transactions through multiple payment instruments using risk analysis. The method 900 is illustrated by the flow chart indicated in FIG. 9. The method 900 is performed by processing logic, which may comprise hardware, software, or a combination of both. The processing logic may be either in the online payment service 120, or partially or entirely in a separate device and/or system(s).

The method 900 commences with providing the seller registration interface 802 to the seller at block 904. The seller registration interface presents to the seller available payment instruments that can be used for conducting payment transactions in the transaction facility 130.

At block 906, processing logic in the online payment service 120 receives information on payment instruments selected by the seller from the list of available payment instruments. At block 908, processing logic in the online payment option 120 determines whether the seller is qualified to use the payment instruments selected by the seller. This determination is performed using the risk management system 720 as described above in conjunction with FIG. 7.

The method 900 continues with providing the end of business transaction interface 804 which specifies those payment instruments selected by the seller that were approved during the risk analysis process (block 910). Next, at decision box 912, a determination is made as to whether an initiator of the payment transaction is the seller or the buyer. If the seller initiates the payment transaction, the seller is provided with the seller login interface 806 to enable the seller to login to the online payment service (block 914). At block 916, the seller is presented with the invoice form interface 916.

Next, at block 918, processing logic in the online payment service 120 receives invoice information entered by the seller through the invoice form interface 808 and then, at block 920, determines whether the seller is qualified to submit the payment transaction described by the invoice information. That is, the risk management system 720 is used to evaluate a likelihood of the seller's ability to fulfill the purchase according to the invoice terms. If processing logic in the online payment service 120 determines that the seller is qualified to submit this payment transaction, the buyer is sent an e-mail which contains a link to begin payment. The link enables the buyer to access the buyer login interface 810 (block 922).

Alternatively, if the initiator of the payment transaction is the buyer, the method 900 proceeds directly to block 922, at which the buyer is presented with the buyer login interface 810. The buyer login interface 810 includes information instructing the buyer to notify the seller (e.g., by e-mail using included e-mail template) about the buyer's willingness to conduct the payment transaction through one of the available payment instruments.

Further, after the buyer successfully logs in to the online payment service 120, at decision box 924, a determination is made as to whether the buyer is registered with the online payment service 120. If the buyer is not registered, the buyer is requested to specify a preferred payment method for this payment transaction through the payment option interface 810. If the buyer initiated the payment transaction, the preferred payment method may be selected from multiple payment instruments available for conducting payment transactions in the transaction facility 130. Alternatively, if the initiator of the payment transaction was the seller, the preferred payment method may be selected from the payment instruments approved in the qualification process described above.

At decision box 928, a determination is made as whether the buyer is qualified to use the preferred payment instrument using the risk evaluation process described above. If the buyer is not qualified to use this payment instrument, the method 900 returns to block 926, at which the buyer is asked to select another payment instrument. Alternatively, if the buyer is qualified, at block 930, the buyer's personal billing information pertaining to the preferred billing instrument is received from the buyer through the personal billing information interface 814. Information included in the personal billing information interface 814 varies depending on the payment instrument selected by the buyer. In addition, the buyer may be requested to enter the buyer's shipping information through the shipping information interface 816.

Next, at block 934, processing logic in the online payment service 120 processes the buyer's payment and generates the confirmation interface 820 notifying the buyer either that the purchase is complete (e.g., the payment is made through a credit card) or that the buyer's payment has been initiated (e.g., the payment is made through an electronic funds transfer). Further, the buyer is presented with the buyer registration interface 822 which enables the buyer to store the buyer's personal billing information and shipping information in an account maintained for the buyer by the online payment service 120. The method 900 then proceeds to block 936.

In an alternate embodiment, in which the buyer is already registered with the online payment service 120, the method 900 proceeds to block 927, at which the buyer is invited to revise his or her billing and/or shipping information through the revision of billing and shipping information interface 813. Then, the method 900 proceeds to block 934 and further to block 934.

At block 934, processing logic in the online payment service 120 disburses funds to the seller. In one embodiment, multiple payments made by various buyers using the same or different payment instruments are accumulated on behalf of the seller over a certain period of time and then a single disbursement (in the amount equal to the accumulated payments minus an appropriate service fee) is distributed to the seller. In one embodiment, the time of disbursement, the manner of disbursement (e.g., a payment instrument to be used for disbursement) and the amount of the service fee are determined based on the risk evaluation process described above in conjunction with FIG. 7.

Exemplary user interfaces will now be further described with reference to FIGS. 10-19. While the exemplary interfaces are described as comprising markup language documents displayed by a browser, it will be appreciated that the described interfaces could comprise user interfaces presented by any Windows® client application or stand-alone application, and need not necessarily comprise markup language documents. In addition, it will be appreciated by those skilled in the art that, although the exemplary interfaces are described in the context of an auction facility, they may be implemented in a wide variety of different types of computer-based, and network-based, transaction facilities.

Figure 10:
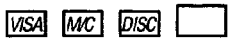

FIG. 10 illustrates an exemplary seller registration interface 802 that enables the seller to specify various options concerning business transactions that are conducted in the environment of the transaction facility 130. Some of the various options pertain to payment options, such as payment methods 1010 and online payments 1020. The online payments 1020 specify multiple payment instruments. Although FIG. 10 illustrates only credit card and electronic check payment instruments, the seller registration interface may identify a wide variety of other payment instruments as described above. Using one or more check boxes corresponding to the payment instruments (e.g. check box 1022 and 1024), the seller may specify what payment instruments he or she will accept in payment transactions with various buyers.

FIG. 11 illustrates an exemplary end of business transaction interface 804 which in this example indicates the end of auction. The end of business transaction interface specifies payment instruments selected by the seller (e.g. a credit card 1110 and an electronic check 1120) and enables either the seller or the buyer to initiate the payment transaction by using a corresponding link (i.e., a seller link 1124 or a buyer link 1124).

Figure 12:
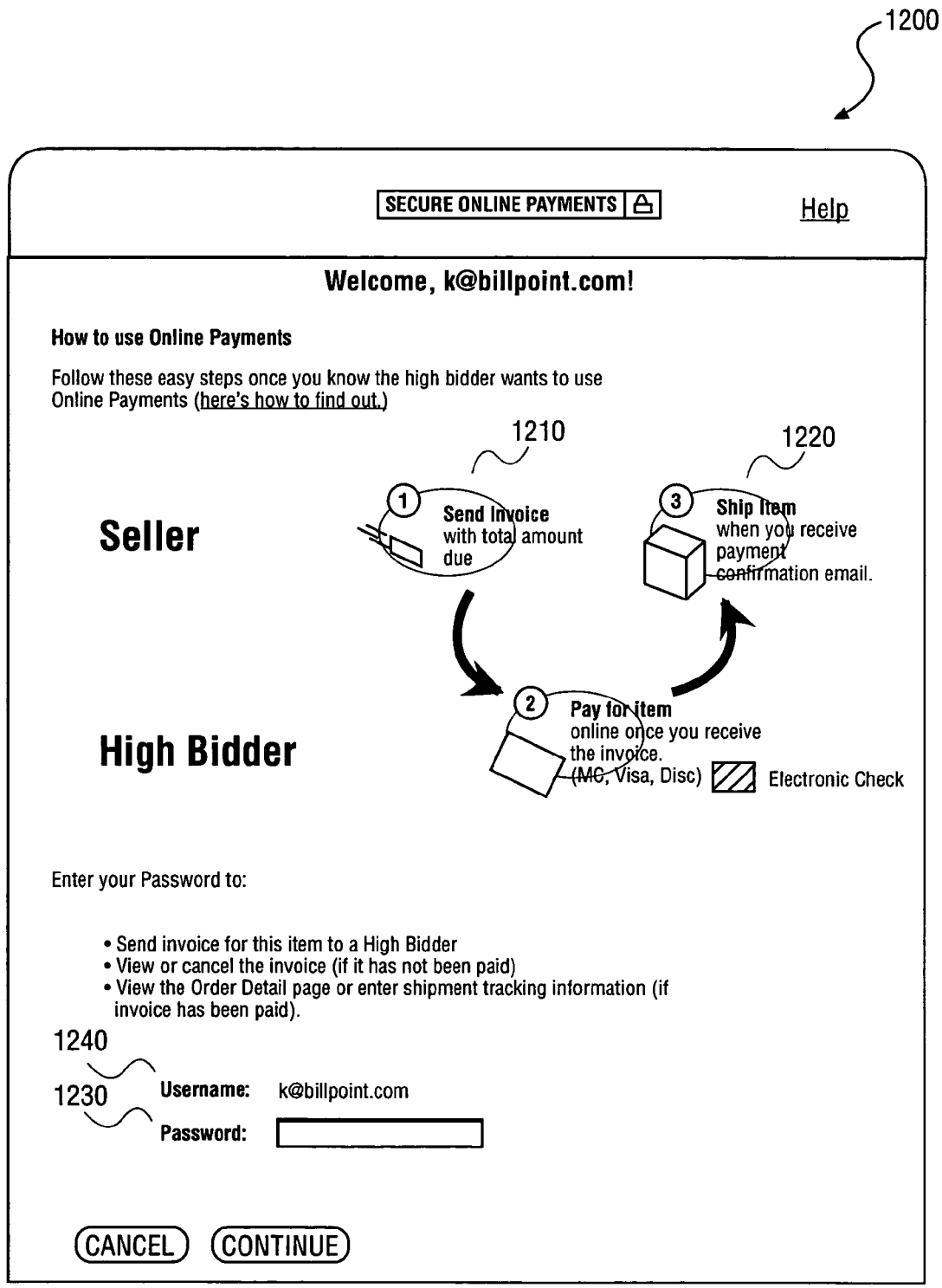

FIG. 12 is an exemplary seller login interface 806 which enables the seller to login to the online payment service 120 by providing the seller's password 1230. The seller login interface 806 also includes links to explanations on how to use online payments (e.g., a link 1210 to an explanation for a first step of sending an invoice and a link 1220 to an explanation for a second step of shipping an item).

Figure 13:

FIG. 13 is an exemplary invoice form interface 808 which includes input fields for entering various invoice information (e.g., a final auction price 1330, shipping insurance 1340, sales tax 1350, a message 1386, and a return policy 1388). The invoice interface also specifies payment instruments 1380 that are acceptable for this transaction (e.g., credit card 1382 and electronic check 1384) and provides information on how the payment transaction will be processed. For example, if the buyer chooses to pay with a credit card, the seller will be notified that the payment is processed once the buyer's credit card information is received. If the buyer pays with an electronic check, the seller will be notified about the completion of the payment transaction after the expiration of a certain time period (e.g. in 3-5 days).

Figure 14:
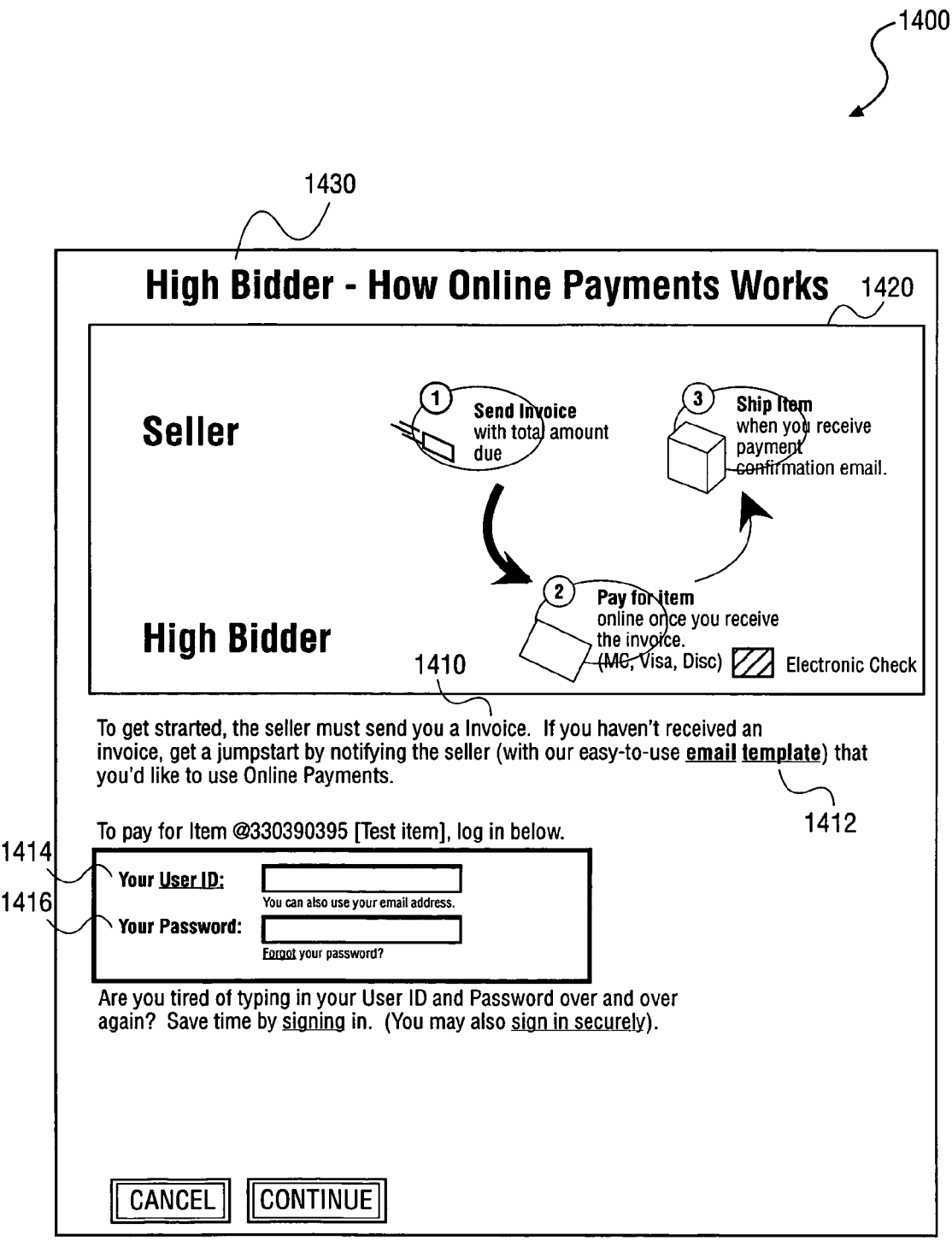

FIG. 14 is an exemplary buyer login interface 810 which enables the buyer to login to the online payment service 120 by providing the buyer's user identifier 1414 and password 1416. In addition, the buyer login interface 810 includes information indicating that the payment transaction must be either initiated by the seller 230 (text 1410) or the buyer (text 1412).

Figure 15:
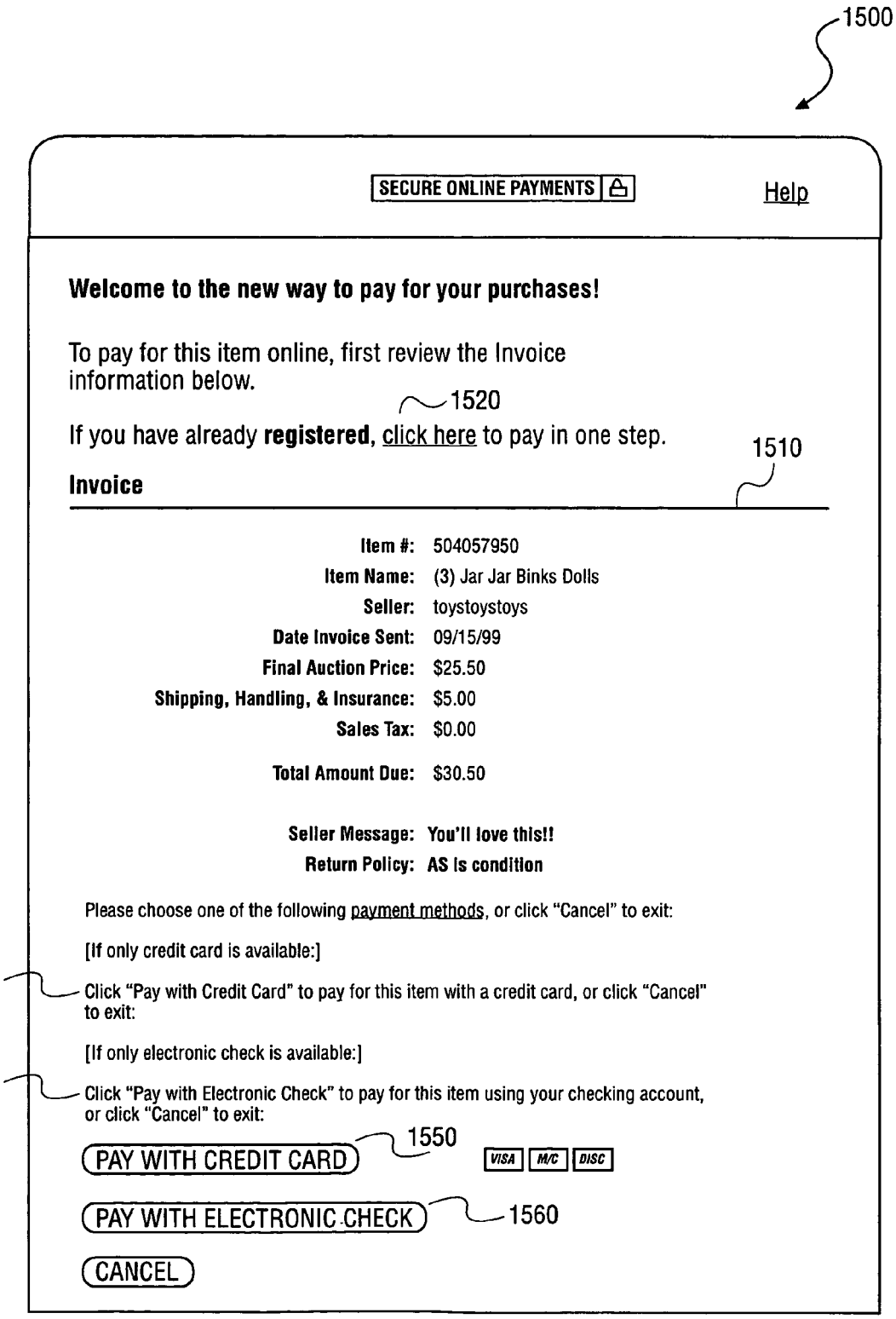

FIG. 15 is an exemplary payment option interface 812 which includes invoice information 1510 and asks the buyer to select one of the online payment methods (e.g., a credit card 1530 or an electronic check 1540) by using either a "pay with credit card" button 1550 or a "pay with electronic check" button 1560. The payment option interface also allows the buyer to pay in one step using a link 1520 if the buyer is registered with the online payment service 120.

FIG. 16 is an exemplary billing information interface 814 generated in response to a buyer request to pay with a credit card payment instrument. The interface 814 includes input fields 1620 pertaining to the buyer's credit card information. In addition, the interface 814 includes information indicating that the buyer's billing information is kept confidential and will not be disclosed to the seller.

FIG. 17 is an exemplary billing information interface 814 generated in response to a buyer request to pay with an electronic check payment instrument. The interface 814 includes the buyer's checking account information including a bank name 1710, a bank routing number 1720, a checking account 1730, and a buyer's name and a checking account address 1750. In one embodiment, in order to prevent potential fraudulent activity, the interface 814 includes secondary form of identification input fields 1762-1768.

Figure 18:

FIG. 18 is an exemplary buyer registration interface 822 including input fields 1810-1850 enabling the buyer to register with the online payment service 120 for storing his or her billing information in an account maintained by the online payment service 120.

Figure 19:

FIG. 19 is an exemplary confirmation interface 820 notifying the user that the payment transaction has been initiated.

In summary, it will be appreciated that the above described interfaces, and underlying technologies, provide a convenient vehicle for facilitating payment transactions in a transaction facility using multiple payment instruments.

Figure 20:
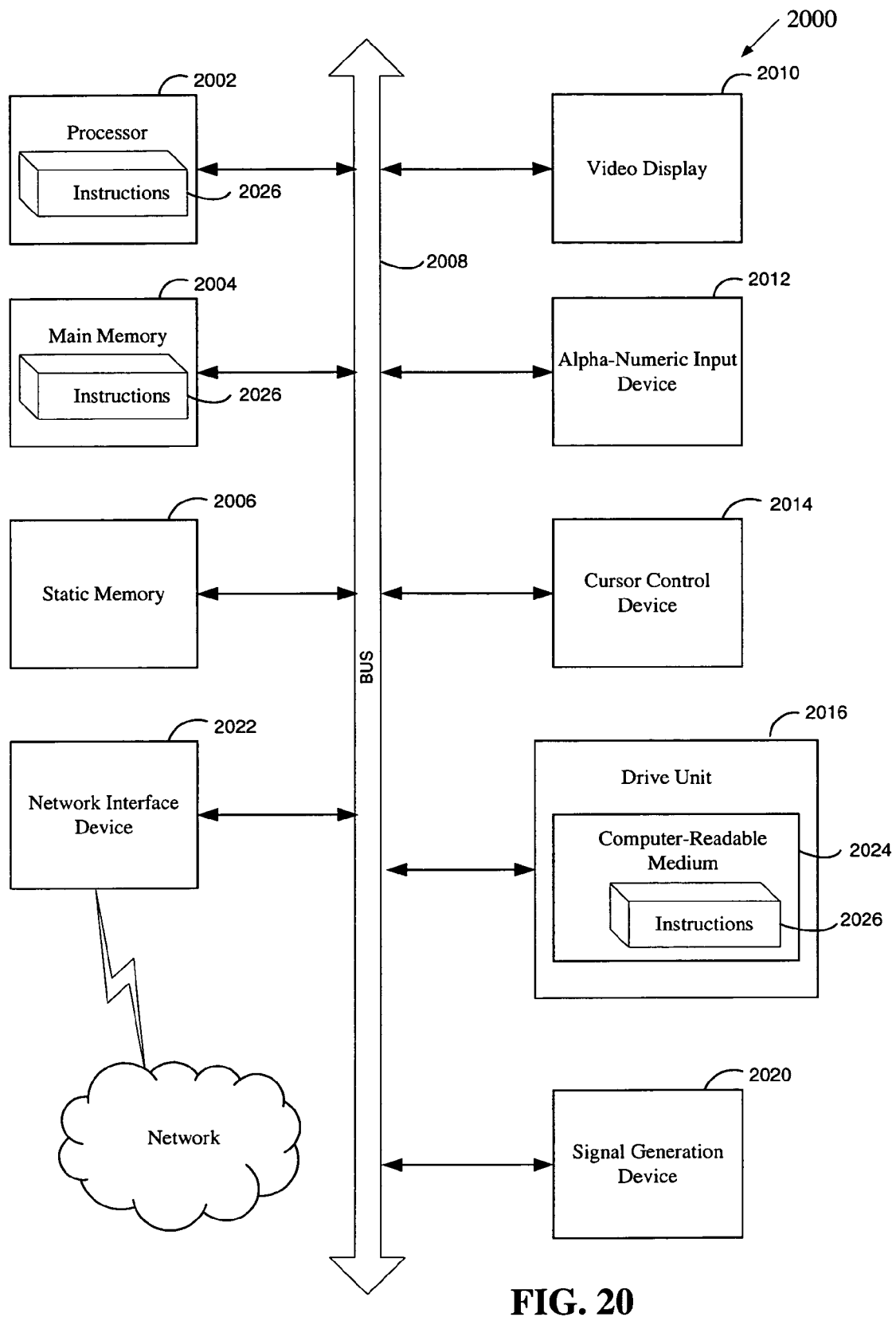
FIG. 20 is a block diagram of one embodiment of a computer system.

FIG. 20 shows a diagrammatic representation of machine in the exemplary form of a computer system 2000 within which a set of instructions, for causing the machine to perform any one of the methodologies discussed above, may be executed. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 2000 includes a processor 2002, a main memory 2004 and a static memory 2006, which communicate with each other via a bus 2008. The computer system 2000 may further include a video display unit 2010 (e.g., a liquid crystal display (LCD) or a cathode ray tube (CRT)). The computer system 2000 also includes an alpha-numeric input device 2012 (e.g., a keyboard), a cursor control device 2014 (e.g., a mouse), a disk drive unit 2016, a signal generation device 2020 (e.g., a speaker) and a network interface device 2022.

The disk drive unit 2016 includes a computer-readable medium 2024 on which is stored a set of instructions (i.e., software) 2026 embodying any one, or all, of the methodologies described above. The software 2026 is also shown to reside, completely or at least partially, within the main memory 2004 and/or within the processor 2002. The software 2026 may further be transmitted or received via the network interface device 2022. For the purposes of this specification, the term "computer-readable medium" shall be taken to include any medium that is capable of storing or encoding a sequence of instructions for execution by the computer and that cause the computer to perform any one of the methodologies of the present invention. The term "computer-readable medium" shall accordingly be taken to included, but not be limited to, solid-state memories, optical and magnetic disks, and carrier wave signals.

Thus, a method and apparatus for facilitating online payment transactions in a network-based transaction facility using multiple payment instruments have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A computer-implemented method for facilitating online payment transactions between participants in a network-based transaction facility, the computer-implemented method comprising:

communicating to a first participant, information identifying a plurality of payment instruments available for processing online payment transactions in the network-based transaction facility, the information to facilitate a selection by the first participant of at least one of the plurality of payment instruments that the first participant is willing to accept when receiving a payment from a second participant;

receiving payment option information from the first participant, the payment option information identifying the selection of the at least one of the plurality of payment instruments;

determining that the first participant is qualified to accept the at least one of the plurality of payment instruments, the determination being based on a risk management operation;

communicating the payment option information to the second participant via a communications network;

determining a risk level of an online payment transaction between the first participant and the second participant using at least feedback information, the feedback information pertaining to the second participant and including information provided by peers of the second participant in the network-based transaction facility, the risk level to determine whether the second participant is qualified to use a payment instrument selected by the second participant from the at least one payment instrument acceptable to the first participant; and accepting personal billing information concerning the selected payment instrument if the second participant is qualified to use the selected payment instrument, the personal billing information being accepted via the communications network to facilitate the online payment transaction between the first participant and the second participant.

2. The computer-implemented method of claim 1 further comprising:

dynamically evaluating risk involved in the online payment transaction between the first participant and the second participant; and restricting the online payment transaction based on the evaluated risk.

3. The computer-implemented method of claim 2, wherein the involved risk is evaluated using various information concerning the first participant and the second participant, the various information including information stored by an online payment service and information obtained from any one of a plurality of third party risk analysis providers via the communications network.

4. The computer-implemented method of claim 2, wherein the involved risk is evaluated at various stages of the online payment transaction between the first participant and the second participant.

5. The computer-implemented method of claim 1 further comprising:

accepting multiple payments issued to the first participant in a course of business transactions conducted by the first participant;

accumulating the multiple payments over a period of time as a single accumulated payment; and disbursing the single accumulated payment to the first participant.

6. The computer-implemented method of claim 5, wherein the multiple payments are accepted over the communications network using the plurality of payment instruments.

7. The computer-implemented method of claim 1, wherein the network-based transaction facility comprises a network-based auction facility.

8. The computer-implemented method of claim 1 further comprising:

communicating the personal billing information of the second participant to a financial institution to process the online payment transaction, the personal billing information being communicated over the communications network; and notifying the first participant when the online payment transaction completes.

9. The computer-implemented method of claim 1 further comprising:

enabling the first participant to initiate the online payment transaction via communications network;

communicating to the first participant an invoice form interface to obtain invoice information from the first participant;

determining that the first participant is qualified to initiate the online payment transaction described by terms included in the invoice information; and passing the invoice information to the second participant.

10. The computer-implemented method of claim 1 further comprising:

enabling the second participant to initiate the online payment transaction via communications network;

communicating to the first participant information indicating a willingness of the second participant to use at least one of the plurality of payment instruments; and providing a billing information interface to the second participant to obtain personal billing information concerning the at least one of the plurality of payment instruments if the second participant is qualified to use the at least one of the plurality of payment instruments.

11. The computer-implemented method of claim 1, wherein the personal billing information is encrypted.

12. The computer-implemented method of claim 1, wherein the personal billing information of the second participant is not disclosed to the first participant unless permitted by the second participant.

13. A system for facilitating online payment transactions between participants in a network-based transaction facility, the system comprising:

the network-based transaction facility to implement a transaction system that facilitates business transactions between a user and another user;

a client, coupled to the network-based transaction facility, to present information identifying a plurality of payment instruments available for processing online payment transactions pertaining to corresponding business transactions, the presented information facilitating a selection by the user of at least one of the plurality of payment instruments that the user is willing to accept when receiving a payment from the other user, and to communicate payment option information of the user over a communications network, the payment option information identifying the selection of the at least one of the plurality of payment instruments; and an online payment service, coupled to the network-based transaction facility and the client via the communications network, the online payment service to receive the payment option information from the client, to determine that the user is qualified to accept the at least one of the plurality of payment instruments, the determination being based on a risk management operation, to make the payment option information available to the other user via the communications network, to enable the other user to select a preferred payment instrument from the at least one of the payment instruments acceptable to the user, to determine whether the other user is qualified to use the preferred payment instrument based on a determination of a risk level of an online payment transaction between the user and the other user, and to accept personal billing information concerning the preferred payment instrument from the other user via the communications network if the other user is qualified to use the preferred payment instrument, wherein the risk level is performed using feedback information pertaining to the other user and provided by peers of the other user in the network-based transaction facility.

14. The system of claim 13, wherein the online payment service comprises:
a risk management system to dynamically evaluate risk involved in the online payment transaction between the user and the other user; and
a payment processing system to restrict the online payment transaction based on the evaluated risk.

15. The system of claim 14, wherein the involved risk is evaluated using various information concerning the user and the other user, the various information including information stored by an online payment service and information obtained from any one of a plurality of third party risk analysis providers via the communications network.

16. The system of claim 14, wherein the involved risk is evaluated at various stages of the online payment transaction between the user and the other user.

17. The system of claim 13 wherein the online payment service is further configured to
accept multiple payments issued to the user in a course of business transactions conducted by the user;
accumulate the multiple payments over a period of time as a single accumulated payment, and
disburse the single accumulated payment to the user.

18. The system of claim 17 wherein the multiple payments are accepted over the communications network using the plurality of payment instruments.

19. The system of claim 13 wherein the network-based transaction facility comprises a network-based auction facility.

20. The system of claim 13, wherein the online payment service is configured to
communicate the personal billing information of the other user to a financial institution to process the online payment transaction, the personal billing information being communicated over the communications network, and
notify the user when the online payment transaction completes.

21. The system of claim 13, wherein the online payment service is configured to
enable the user to initiate the online payment transaction via communications network,
communicate to the user an invoice form interface to obtain invoice information from the user,
determine that the user is qualified to initiate the online payment transaction described by terms included in the invoice information, and
pass the invoice information to the other user.

22. The system of claim 13, wherein the online payment service is configured to
enable the other user to initiate the online payment transaction via communications network,
communicate to the user information indicating a willingness of the other user to use at least one of the plurality of payment instruments, and
provide a billing information interface to the other user to obtain personal billing information concerning the at least one of the plurality of payment instruments if the other user is qualified to use the at least one of the plurality of payment instruments.

23. The system of claim 13 wherein the personal billing information is encrypted.

24. The system of claim 13, wherein the personal billing information of the other user is not disclosed to the user unless permitted by the other user.

25. A machine-readable medium comprising instructions, which when executed on a machine, cause the machine to perform a method for facilitating online payment transactions between participants in a network-based transaction facility, the method comprising:
communicating to a first participant, via a communications network, information identifying a plurality of payment instruments available for processing online payment transactions in the network-based transaction facility, the information to facilitate a selection by the first participant of at least one of the plurality of payment instruments that the first participant is willing to accept when receiving a payment from a second participant;
receiving payment option information from the first participant via the communications network, the payment option information identifying the selection of the at least one of the plurality of payment instruments;
determining that the first participant is qualified to accept the at least one of the plurality of payment instruments, the determination being based on a risk management operation;
communicating the payment option information to the second participant via the communications network;
determining a risk level of an online payment transaction between the first participant and the second participant using feedback information, pertaining to the second participant and provided by peers of the second participant in the network-based transaction facility, to determine, based on the risk level, whether the second participant is qualified to use a payment instrument selected by the second participant from the at least one payment instrument acceptable to the first participant; and
accepting personal billing information concerning the selected payment instrument if the second participant is qualified to use the selected payment instrument, the personal billing information being accepted via the communications network to facilitate the online payment transaction between the first participant and the second participant.

* * * * *